United States Patent
Lee et al.

(10) Patent No.: US 11,261,706 B1
(45) Date of Patent: *Mar. 1, 2022

(54) IN SITU TREATMENT ANALYSIS MIXING SYSTEM

(71) Applicant: TETRA Technologies, Inc., The Woodlands, TX (US)

(72) Inventors: David A. Lee, The Woodlands, TX (US); Yannick Harvey, The Woodlands, TX (US)

(73) Assignee: TETRA Technologies, Inc., The Woodlands, TX (US)

( * ) Notice: Subject to any disclaimer, the term of this patent is extended or adjusted under 35 U.S.C. 154(b) by 447 days.

This patent is subject to a terminal disclaimer.

(21) Appl. No.: 16/283,901

(22) Filed: Feb. 25, 2019

Related U.S. Application Data

(63) Continuation of application No. 14/921,295, filed on Oct. 23, 2015, now Pat. No. 10,213,757.

(51) Int. Cl.
| | | |
|---|---|---|
| *B01F 3/08* | (2006.01) | |
| *E21B 41/00* | (2006.01) | |
| *G05D 11/00* | (2006.01) | |
| *E21B 21/06* | (2006.01) | |

(52) U.S. Cl.
CPC ............ *E21B 41/00* (2013.01); *B01F 3/0803* (2013.01); *E21B 21/062* (2013.01); *G05D 11/00* (2013.01)

(58) Field of Classification Search
CPC .................................................... B01F 3/0803
USPC ....................... 366/152.1–152.4, 160.1–160.4
See application file for complete search history.

(56) References Cited

U.S. PATENT DOCUMENTS

| | | | | |
|---|---|---|---|---|
| 4,621,927 | A * | 11/1986 | Hiroi ................ | B01F 15/00292 366/132 |
| 4,964,732 | A * | 10/1990 | Cadeo ............... | B01F 15/00142 366/142 |
| 5,641,410 | A * | 6/1997 | Peltzer ................ | B01J 19/0006 137/5 |
| 5,993,671 | A * | 11/1999 | Peltzer ................... | C02F 1/008 137/5 |
| 6,224,778 | B1 * | 5/2001 | Peltzer ................... | C02F 1/008 137/3 |
| 6,799,883 | B1 * | 10/2004 | Urquhart ........... | B01F 15/00227 137/3 |
| 6,923,568 | B2 * | 8/2005 | Wilmer .............. | B01F 15/0408 366/152.1 |
| 7,905,653 | B2 * | 3/2011 | Wilmer .................. | B01F 5/061 366/132 |
| 10,213,757 | B1 * | 2/2019 | Lee ........................ | G05D 21/02 |
| 2002/0048213 | A1 * | 4/2002 | Wilmer ................ | G05D 11/135 366/136 |
| 2004/0125688 | A1 * | 7/2004 | Kelley ................. | G05D 11/132 366/152.2 |
| 2010/0031825 | A1 * | 2/2010 | Kemp .................... | B01F 3/088 99/275 |
| 2012/0300573 | A1 * | 11/2012 | Urquhart ........... | B01F 15/00207 366/151.1 |

* cited by examiner

*Primary Examiner* — David L Sorkin
(74) *Attorney, Agent, or Firm* — Roy Kiesel Ford Doody & North, APLC; Brett A. North

(57) ABSTRACT

The present invention describes methods, systems, and apparatuses for controlled delivery of wellbore fluids including analysis and treatment within the methods, systems, and apparatuses themselves.

20 Claims, 18 Drawing Sheets

IN SITU TREATMENT ANALYSIS MIXING SYSTEM

CROSS-REFERENCE TO RELATED APPLICATIONS

This is a continuation of U.S. patent application Ser. No. 14/921,295, filed on Oct. 23, 2015 (issuing as U.S. Pat. No. 10,213,757 on Feb. 26, 2019). The above referenced patent application is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field

In various embodiments are describe methods, systems, and apparatuses for controlled delivery of fluids for wellbore operations including analysis and treatment within the methods, systems, and apparatuses themselves. In various embodiments one of the wellbore operations can be fracturing.

The present state of the art does not include a method and apparatus for treating multiple streams of fluids having different chemical and physical characteristics, and controllably blending the multiple streams to obtain a predefined target physical and/or chemical characteristics.

U.S. Pat. No. 8,162,048; 8,211,296; 8,226,832; 8,316,935; 8,540,022; 8,640,901; 8,834,016; 9,052,037; 9,144,775; and United States Patent Application Publication No. 2010/0059226 are incorporated herein by reference.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

In various embodiments are provided methods, systems, and apparatuses for blending treatment of multiple pressurized fluid streams for the controlled delivery of fluids for wellbore operations satisfying one or more predefined target physical and/or chemical characteristics.

In various embodiments the method and apparatus can controllably blend multiple streams of pressurized fluid having differing chemical and/or physical characteristics between the streams to achieve a selected predefined target physical or chemical characteristic of the blended stream and at a selected predefined blended stream flow rate.

In various embodiments the method and apparatus can include the steps of:

a) providing first and second pressurized sources of aqueous base fluid having first and second flow rates for creating a blended pressurized flow having a blended target flow rate and blended target predetermined physical and/or chemical characteristic values;

b) blending the first and second pressurized sources of fluid creating a blended pressurized stream of aqueous base fluid having a blended flow rate;

c) testing the blended pressurized stream aqueous base fluid to determine the blended stream's physical and/or chemical characteristic data;

d) comparing the tested physical and/or chemical characteristic data of the blended stream of step "b" to the target physical and/or chemical characteristic values for the blended stream;

e) based on the comparison made in step "d" a controller, operatively connected to the first and second streams, altering the first and second flow rates while maintaining substantially the same target blended flow rate; and f) repeating steps "c" through "e" until the blended pressurized stream of aqueous base fluid achieves the target predetermined physical and chemical characteristic values.

In various embodiments a base fluid can be used as a base or component part for preparation of a final fluid for use in wellbore operations.

In various embodiments the method and apparatus can determine that a target physical and/or chemical characteristic value has been achieved where the actual tested value of the physical and/or chemical characteristic data for the blended pressurized stream varies from the target value by at most 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 11, 12, 13, 14, 15, 16, 17, 18, 19, and 20 percent. In various embodiments, the percentage of variation can fall within a range of between any two of the above specified maximum percentage variation.

In various embodiments testing step "c" is performed at specified timed intervals (and/or within ranges of specified time intervals) as described in other embodiments in this application. In various embodiments testing step "c" includes determining the flow rates of the first and second pressurized streams.

In various embodiments the method can include the additional step of testing one or more of the first or second pressurized streams to determine said stream's physical and/or chemical characteristics prior to blending of these first and second streams.

In various embodiments the method and apparatus can determine that substantially the same flow rate for the blended flow rate has been achieved where the actual measured flow for the blended pressurized stream varies from the target flow rate by at most 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 11, 12, 13, 14, 15, 16, 17, 18, 19, and 20 percent. In various embodiments, the percentage of variation can fall within a range of between any two of the above specified variation percentages.

In various embodiments the method can include the steps of:

a) providing first and second pressurized sources of an aqueous base fluid for use in wellbore fluid production having respective flow rates and a system for controlling the flow rates of the first and second pressurized sources comprising first and second controllable valves operatively connected to the first and second pressurized sources, first and second flow sensors, and a controller operatively connected to the first and second valves and flow sensors, and a blended stream sensor that is operatively connected to the controller;

b) blending the first and second pressurized sources of aqueous base fluid together into a blended pressurized source of aqueous base fluid;

c) the blended stream sensor testing at predetermined timed intervals the blended pressurized source of aqueous base fluid to determine a physical and/or chemical characteristic of the blended pressurized source;

d) comparing within the predetermined timed intervals the tested physical and/or chemical characteristics of the blended pressurized source of aqueous base fluid to predetermined target physical and/or chemical characteristic values suitable for wellbore operations; and e) based on the comparison made in step "d", modifying the physical and/or chemical characteristics of the blended pressurized source of aqueous base fluid by altering the flow rates of the first and second pressurized sources of an aqueous base fluid within the predetermined timed intervals.

In various embodiments the predefined target physical and/or chemical characteristic values of the blended pressurized source of aqueous base fluid can be selected from the group consisting of: pH, oxidation/reduction potential, turbidity/haze, total oxygen demand, viscosity, ionic strength/conductivity, specific chemical and/or metals concentrations, ionic strength/conductivity, specific chemical concentrations, density, crystallization temperature, biocide and/or microbial demand, free and total bromine/chlorine and/or bromine/chlorine residuals, and combinations thereof.

In various embodiments the method and apparatus can controllably blend multiple streams of pressurized fluid having differing chemical and/or physical characteristics between the streams to achieve a selected predefined target physical and/or chemical characteristic values for the blended stream and at a predefined target blended stream flow rate.

In various embodiment the treatment of a pressurized source of aqueous base fluid includes the step of blending multiple pressurized streams to achieve a predefined target physical and/or chemical value, where the treatment selected from the treatment group consisting of: pH buffering, viscosity modification such as the addition of polymers/viscosifiers to increase viscosity or break polymers/viscosifiers in the fluid to decrease viscosity, filtration, anti-microbial treatment including one or more oxidizing and/or non-oxidizing biocides/antimicrobials, metal contamination treatment(s), ionic strength adjustment, and or adjusting crystallization inhibitors.

In various embodiments the method and apparatus can include the steps of:

a) providing a plurality of pressurized sources of an aqueous base fluid for use in wellbore fluid production having respective flow rates, and providing predetermined target physical and/or chemical characteristic values for wellbore operations;

b) blending at least two of the pressurized sources of aqueous base fluid creating a blended pressurized source of aqueous base fluid;

c) testing the blended pressurized source of aqueous base fluid to determine the blended source's physical and/or chemical characteristics;

d) comparing the tested physical and/or chemical characteristic values of the blended pressurized source of aqueous base fluid of step "b" to the predetermined target physical and/or chemical characteristic values for the fluid to determine if the target values are satisfied;

e) based on the comparison made in step "d" altering the flow rates of at least one of the plurality of pressurized sources of aqueous base fluid of step "a"; and f) repeating steps "c" through "e" until the blended pressurized source of aqueous base fluid achieves the predetermined target physical and/or chemical characteristic values.

In various embodiments the method can include the steps of:

a) providing first and second pressurized sources of an aqueous base fluid for use in wellbore fluid production and having respective flow rates and a system for controlling the flow rates of the first and second pressurized sources comprising first and second controllable valves operatively connected to the first and second pressurized sources, first and second flow sensors, and a controller operatively connected to the first and second valves and flow sensors, and a sensor that is operatively connected to the controller;

b) blending the first and second pressurized sources of aqueous base fluid together into a blended pressurized source of aqueous base fluid;

c) testing at predetermined timed intervals the blended pressurized source of aqueous base fluid to determine a physical or chemical characteristic;

d) comparing within the timed intervals the tested physical or chemical characteristic of the blended pressurized source of aqueous base fluid to predetermined physical and chemical characteristic data for the wellbore fluid to identify suitability of the blended pressurized source for wellbore operations; and e) based on the comparison made in step "d", modifying the physical or chemical characteristic of the blended pressurized source of aqueous base fluid by altering the flow rates of the first and/or second pressurized sources of an aqueous base fluid within the predetermined timed intervals.

In various embodiments is provided a method and apparatus that monitors and controls an aqueous base source of pressurized fluid for use in wellbore fluid production comprising:

a) first and second controllable valves operatively connected to first and second pressurized sources of an aqueous base fluid for a wellbore fluid and having respective flow rates;

b) first and second flow sensors;

c) a controller operatively connected to the first and second valves and flow sensors;

d) a blended sensor that is operatively connected to the controller;

e) wherein the first and second pressurized sources of aqueous fluid are blended together into a blended pressurized source of an aqueous base fluid;

f) wherein the blended sensor tests at predetermined timed intervals the blended pressurized source of aqueous base fluid to determine a physical or chemical characteristic values;

g) wherein the controller compares within the predetermined timed intervals the tested physical or chemical characteristic values of the blended pressurized source of aqueous base fluid to a predetermined target physical and/or chemical characteristic values for the fluid to identify if the target value has been achieved; and h) wherein based on the comparison made in step "f", the controller modifies the physical and/or chemical characteristic of the blended pressurized source of aqueous base fluid by altering the flow rates of the first and/or second pressurized sources of aqueous base fluid with the first and/or second controllable valves until the target values has been achieved.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
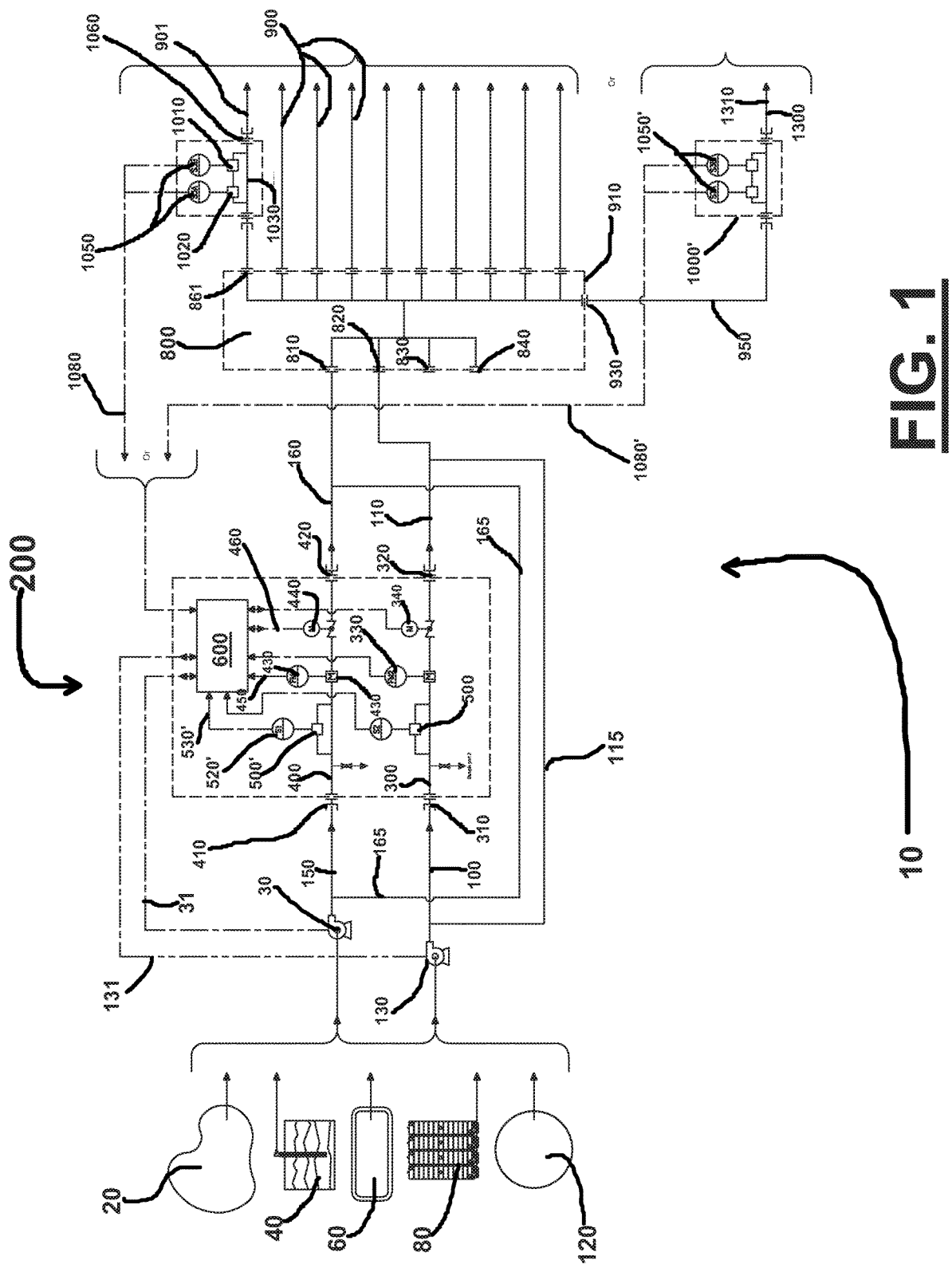
FIG. 1 shows an overall schematic diagram of the method and apparatus.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

In various embodiments the method and apparatus 10 can controllably blend multiple streams of pressurized fluid (e.g., streams 100 and 150) having differing chemical and/or physical characteristics between the streams to achieve a selected predefined target physical or chemical characteristic of the blended stream 1300 and at a selected predefined blended stream flow rate.

In various embodiments the types of predefined target physical and/or chemical characteristics of the blended stream 1300 can be selected from the group consisting of pH, oxidation/reduction potential, turbidity/haze, total oxygen demand, viscosity, ionic strength/conductivity, specific chemical and/or metals concentrations, ionic strength/conductivity, specific chemical concentrations, density, crystallization temperature, biocide and/or microbial demand, free and total bromine/chlorine and/or bromine/chlorine residuals, and combinations thereof.

In various embodiments the method and apparatus 10 can controllably blend multiple streams of pressurized fluid (e.g., streams 100 and 150) having differing chemical and/or physical characteristics between the streams to achieve a selected predefined target physical or chemical characteristic of the blended stream 1300 and at a selected predefined blended stream flow rate. In various embodiments the treatment based on the blending of the multiple streams can be selected from the treatment group consisting of: pH buffering, viscosity modification such as the addition of polymers/viscosifiers to increase viscosity or break polymers/viscosifiers in the fluid to decrease viscosity, filtration, antimicrobial treatment including one or more oxidizing and/or non-oxidizing biocides/antimicrobials, metal contamination treatment(s), ionic strength adjustment, and or adjusting crystallization inhibitors.

In various embodiments the method and apparatus 10 can include the steps of:

a) providing a plurality of pressurized sources 115, 165 of an aqueous base fluid having first and second flow rates for creating a blended pressurized flow 1100 having a blended target flow rate and target predetermined physical and chemical characteristic data;

b) blending the pressurized sources 115 and 165 fluid creating a blended pressurized stream of aqueous base fluid 1100 of the target flow rate;

c) testing the blended pressurized stream aqueous base fluid 1100 to determine the blended stream's actual physical and chemical characteristics;

d) comparing the tested physical and chemical characteristic data of the blended stream of step "b" to the target physical and chemical characteristic data for the wellbore fluid;

e) based on the comparison made in step "d" a controller 600 altering the first and second flow rates while maintaining substantially the same target blended flow rate; and f) repeating steps "c" through "e" until the blended pressurized stream of aqueous base fluid 1100 achieves the predetermined physical and chemical characteristics.

In various embodiments the method and apparatus 10 can determine that a target physical and/or chemical characteristic value has been achieved where the actual tested value of the blended pressurized stream 1100 varies from the target value by at most 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 11, 12, 13, 14, 15, 16, 17, 18, 19, and 20 percent. In various embodiments, the percentage of variation can fall within a range of between any two of the above specified variation percentages.

In various embodiments, the physical and/or chemical characteristic data of the blended pressurized fluid stream can be tested at timed intervals. In various embodiments these timed intervals can be less than 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, these timed intervals can fall within a range of between any two of the above specified time intervals.

In various embodiments step "c" is performed at timed intervals (and/or within ranges of the specified time intervals) as described in other embodiments in this application.

In various embodiments step "d" is performed within timed intervals (and/or within ranges) as described in other embodiments in this application.

In various embodiments step "e" is performed at timed intervals (and/or within ranges) as described in other embodiments in this application. In various embodiments step "e" includes determining the flow rates of the plurality of pressurized sources 115,165 before and after alteration.

In various embodiments the timed intervals can be the same for steps "c", "d", and "e".

In various embodiments a flow meter can be fluidly connected to pressurized blended stream 1100 to determine its blended flow rate, and this flow meter is also operatively connected to controller 600 to send the flow rate to the controller.

In various embodiments, the flow rates of the plurality of pressurized fluid sources (and alternatively the flow rate of the blended pressurized stream) can be measured at timed intervals. In various embodiments these timed intervals can be less than 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, these time intervals can fall within a range of between any two of the above specified time intervals.

Example of Method And Apparatus

FIG. 1 is a diagram schematically illustrating one embodiment of the method and apparatus 10 for treating at least two commingled or blended steams of aqueous fluids from at least two different sources of aqueous base fluid (e.g., sources 20, 40, 60, 80, and/or 120) to achieve a selected predefined target physical or chemical characteristic of the blended stream 1300 and at a selected predefined blended stream flow rate of the blended stream 1300.

In various embodiments step "c" includes determining the flow rates of the plurality of pressurized sources 115,165. In various embodiments the method and apparatus 10 can determine that a target blended flow rate of the blended pressurized stream 1100 has been achieved where the actual tested value of the blended pressurized stream 1100 varies from the target value by at most 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 11, 12, 13, 14, 15, 16, 17, 18, 19, and 20 percent. In various embodiments, the percentage of variation can fall within a range of between any two of the above specified variation percentages. In various embodiments the actual tested value can be the combined values of the flow rates of pressurized streams 100 and 150 as measured by flow meters 330 and 430.

FIG. 1 schematically illustrates the steps of:

(a) obtaining of fresh water (e.g., sources 20 and 40) and produced water (e.g., sources 60,80, and/or 120) sources of aqueous base fluids, (b) two of said possible sources of aqueous base fluid are selected and sent in pressurized lines (e.g., lines 100 and 150) to a blending unit 800 for blending (see FIGS. 10A and 10B), where a blending controller 200 intermittently measures and controls the flow rates of the two pressurized lines 100 and 150 to achieve a selected predefined target physical or chemical characteristics of the blended stream 1300 and at a selected predefined blended stream flow rate;

(c) from the blending controller unit 200, the pressurized lines 100 and 150 are directed to the blending manifold 800 where the fluid streams are blending into a single source of blended/commingled aqueous fluid 1300; and (d) this single pressurized source of blended/commingled aqueous fluid 1300 can be sent and/or delivered to one or more frac working tanks 1200 for use in wellbore operations.

The sources of aqueous base fluid for blending or mixing can include natural water sources 20 such as lakes, rivers and streams, fresh or brine water wells 40, and fluids from on or off location earthen pits 60, single or battery frac tanks 80, and above ground storage tanks 120.

The system 10 preferably includes pumps 30 and 130 to pressurize and pump the fluids from the selected sources of aqueous base fluid 20,40,60,80, and/or 120. The pumps 30 and 130 are preferably variable flow pumps. In various embodiments two pressurized streams 100 and 150 can be provided, such as a produced water stream 100 and a fresh water stream 150.

Figure 2:
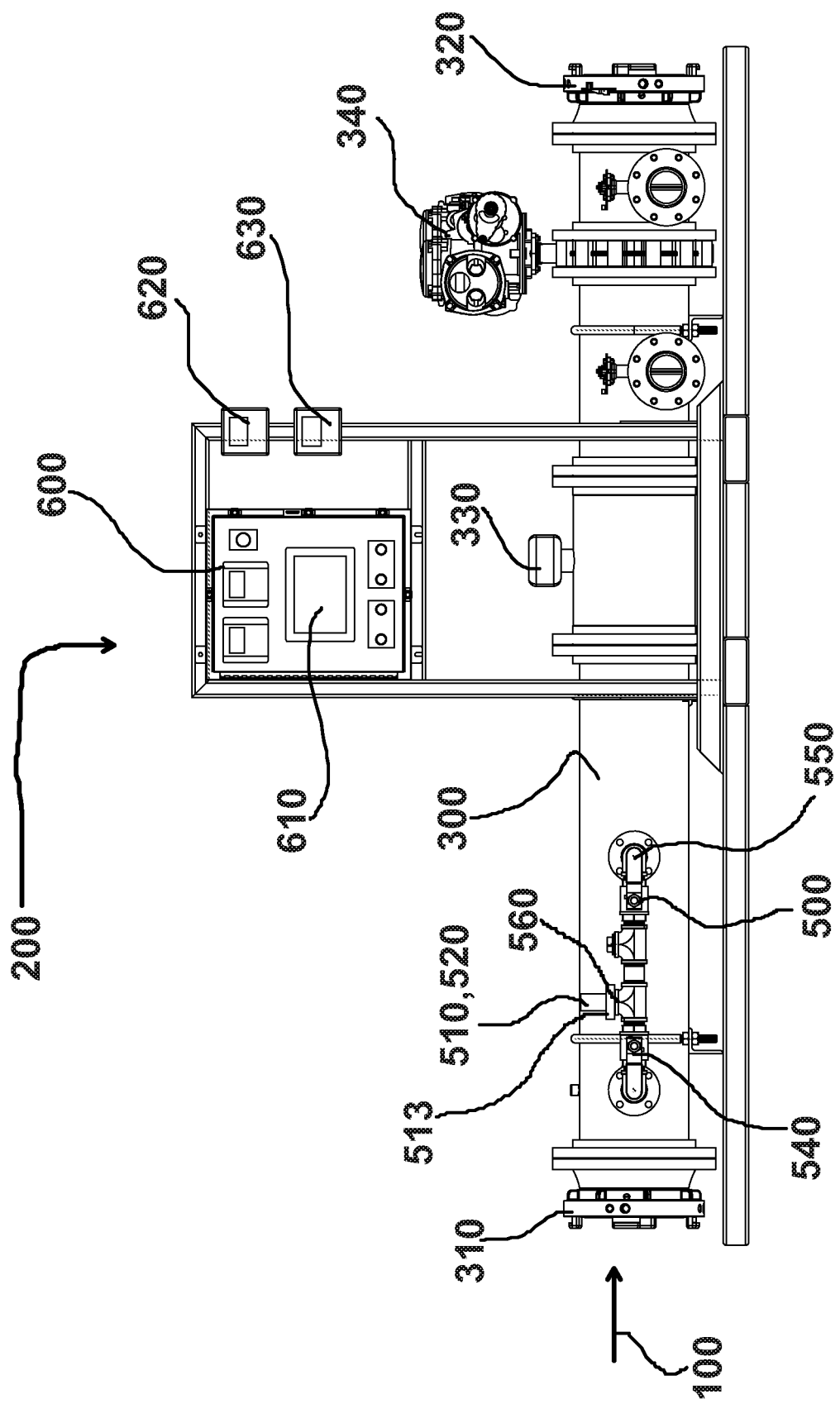
FIG. 2 is a side view of a flow controller system.
Figure 3:
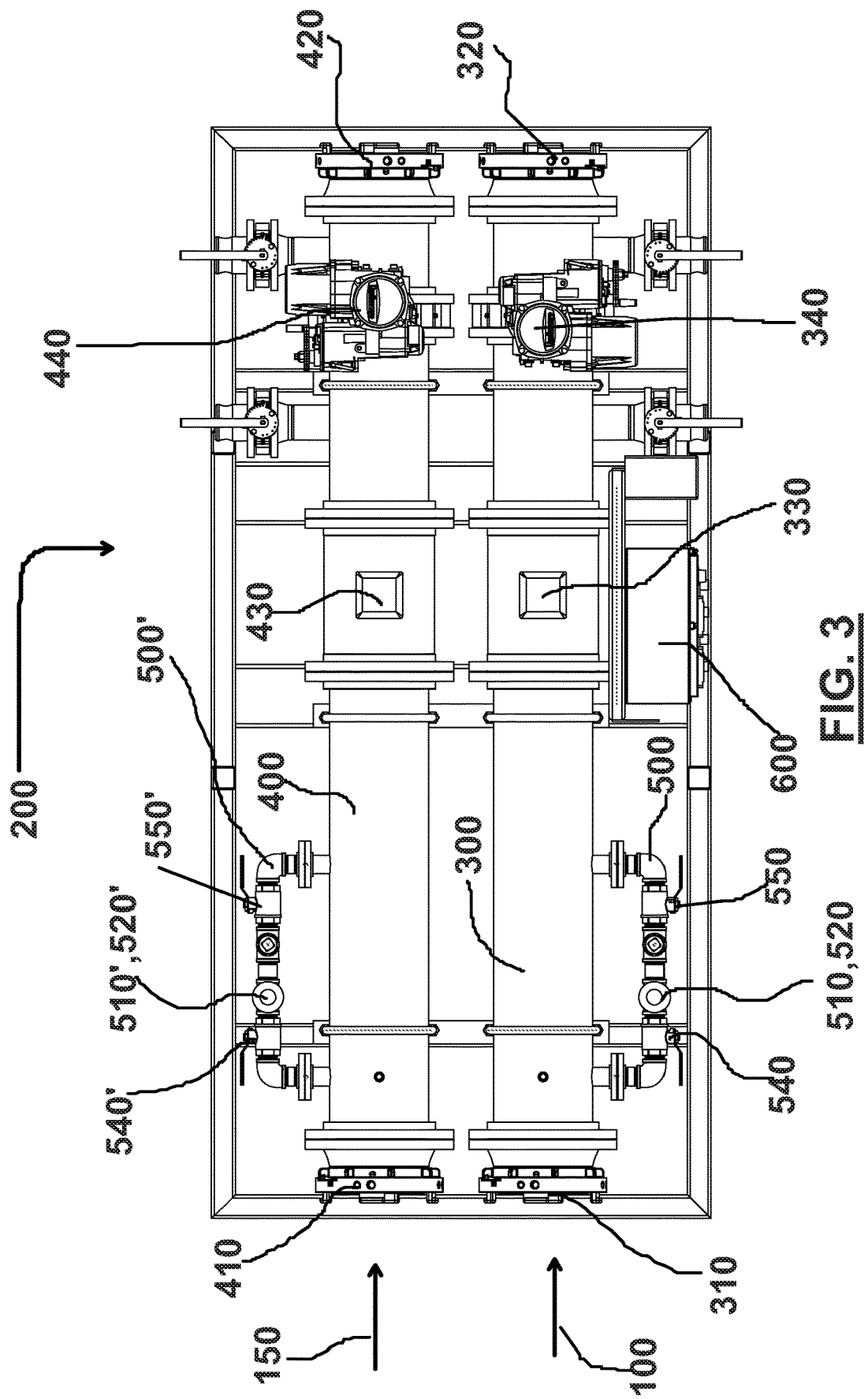
FIG. 3 is a top view of a flow controller system.
Figure 4:
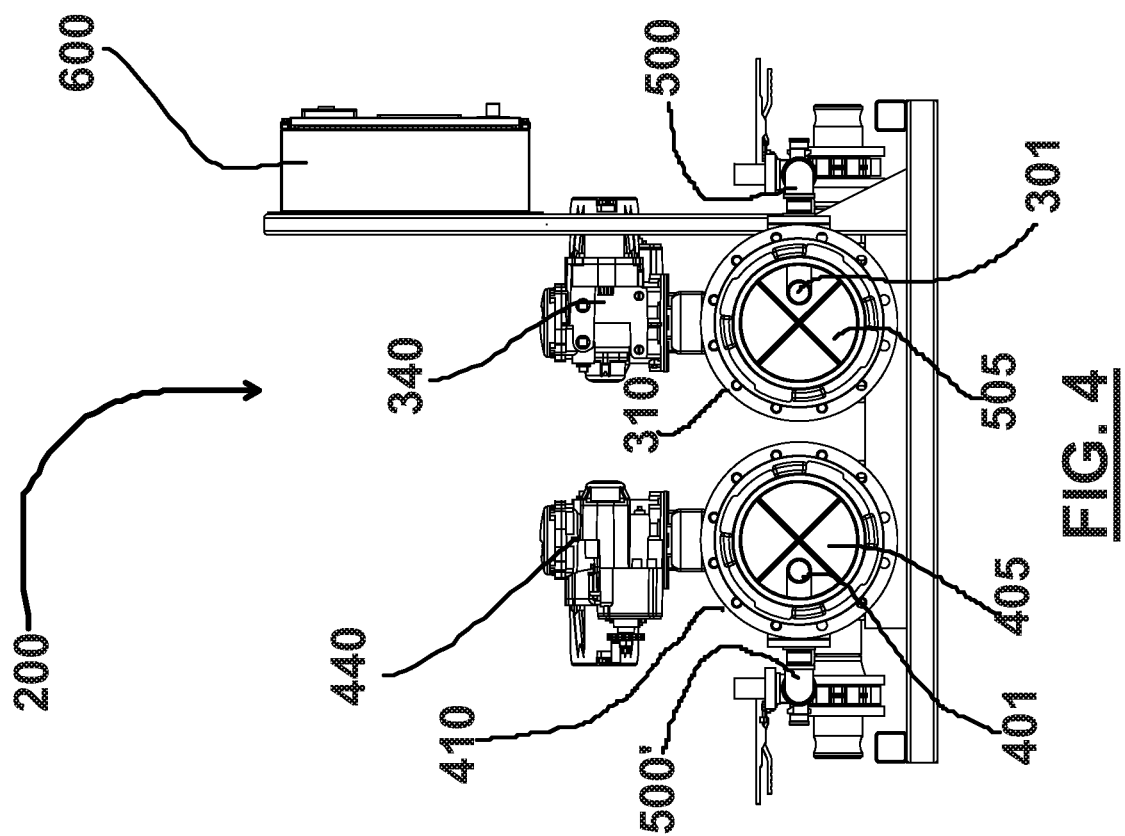
FIG. 4 is an end view of a flow controller system.

A flow controller system/apparatus 200 can be used to controllably vary the flow rates of pressurized fluid streams 100 and 150 to achieve a selected predefined target physical or chemical characteristics of the blended stream 1300 and at a selected predefined blended stream flow rate. FIGS. 2-4 show various views of the flow controller system/apparatus 200.

In various embodiments flow controller system/apparatus 200 can include controller 600 which is operatively connected to flow pipes 300 and 400. Flow pipe 300 can include controllable valve 340 and flow meter 330, both of which can be operatively connected to controller 600. Flow pipe 400 can include controllable valve 440 and flow meter 430, both of which can be operatively connected to controller 600.

Controller 600 can relatively open and relatively close both controllable valves 340 and 440. Such relative opening and closing of the valves 340 and 440 can be performed independently from the other valve. That is, controller 600 can relatively open or close valve 340 regardless of whether valve 440 is relatively opened or closed by controller 600, and vice versa. Controller 600 can relatively open and relatively close both controllable valves 340 and 440 in order to achieve desired flow rates respectively through pipes 300 and 400. Flow meters 330 and 430 can be used by controller in opening/closing valves 340 and 440 in order to achieve the desired flow rates respectively through pipes 300 and 400.

Flow pipe 300 can havebore 305 with first flange 310 and second flange 320. Flow pipe 400 can havebore 405 with first flange 410 and second flange 420.

In the embodiment shown in FIG. 1, flow pipe 300 receives produced water from the produced water stream input 100 via an inlet 310, where the produced water flows through the bore 305 of the produced water pipe 300 and exits from the produced water pipe 300 via an outlet 320. The produced water stream input 100, the produced water stream flowing through the bore 301 of the produced water pipe 300, and a produced water stream output 110 together preferably define a produced water stream 115.

In the embodiment shown in FIG. 1, flow pipe 400 receives fresh water from the fresh water stream input 150 via an inlet 410, where fresh water flows through the bore 405 of the fresh water pipe 400 and exits from the fresh water pipe 400 via an outlet 420. The fresh water stream input 150, the fresh water stream flowing through the bore 401 of the fresh water pipe 400 and a fresh water stream output 160 together preferably defined a fresh water stream 165.

The flow controller system/apparatus 200 can include a plurality of flow meters 330,430 fluidly connected to flow pipes 300 and 400. The plurality of flow meters 330,430 measure the flow rates of the produced and fresh water streams 115,165. In one embodiment, the plurality of flow meters 330,430 measures the flow rates of the produced and fresh water streams 115, 165 continuously.

In various embodiments, flow meters 330, 430 can respectively measure the flow rates of the pressurized fluid streams flowing through pipes 300,400 at timed intervals. Flow meters 330, 430, for example, can measure the flow rates of the produced and fresh water streams 115, 165 at timed intervals of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds. In various embodiments flow meters 330,430 can also measure the flow rates of the pressurized fluid streams flowing through pipes 300,400 in time intervals of 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, the time interval where the plurality of flow meters 330,430 measures the flow rates of the produced and fresh water streams 115, 165 can be within a range of between any two of the above specified time intervals.

In the embodiments shown in FIGS. 1-4, flow controller system/apparatus 200 can include valves 340,440 respectively fluidly connected to pipes 300,400 and operatively connected to controller 600. Controller 600 and valves 340,440 are operatively configured to alter the flow rates of the pressurized fluid streams respectively in pipes 300,400. In various embodiments valves 340,440 can be configured to be transitionable between an open position, where the pressurized fluid streams in pipes 300,400 are generally unobstructed, and a closed position, where the pressurized fluid streams in pipes 300,400 are generally obstructed. The plurality of valves 340,440 are preferably configured to be transitionable to a plurality of positions where the pressurized fluid streams in pipes 300,400 are 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, 99.5, or 100 percent obstructed. In various embodiments, the percentage the valves 340,440 can obstruct the flow of the either the two pressurized fluid streams 115,165 can be within a range of between any two of the above specified percentages. In one embodiment, the valves 340,440 can be butterfly valves.

The flow controller system/apparatus 200 may also include pig catchers 305, 405 that preferably positioned within the bores 301,401 of the produced and fresh water pipes 300, 400 and are sized and shaped to fit within bores 301,401. The pig catchers 305, 405 preferably include crossing bars each having a length that is at most equal to the diameter of the bores 301,401.

Figure 10:
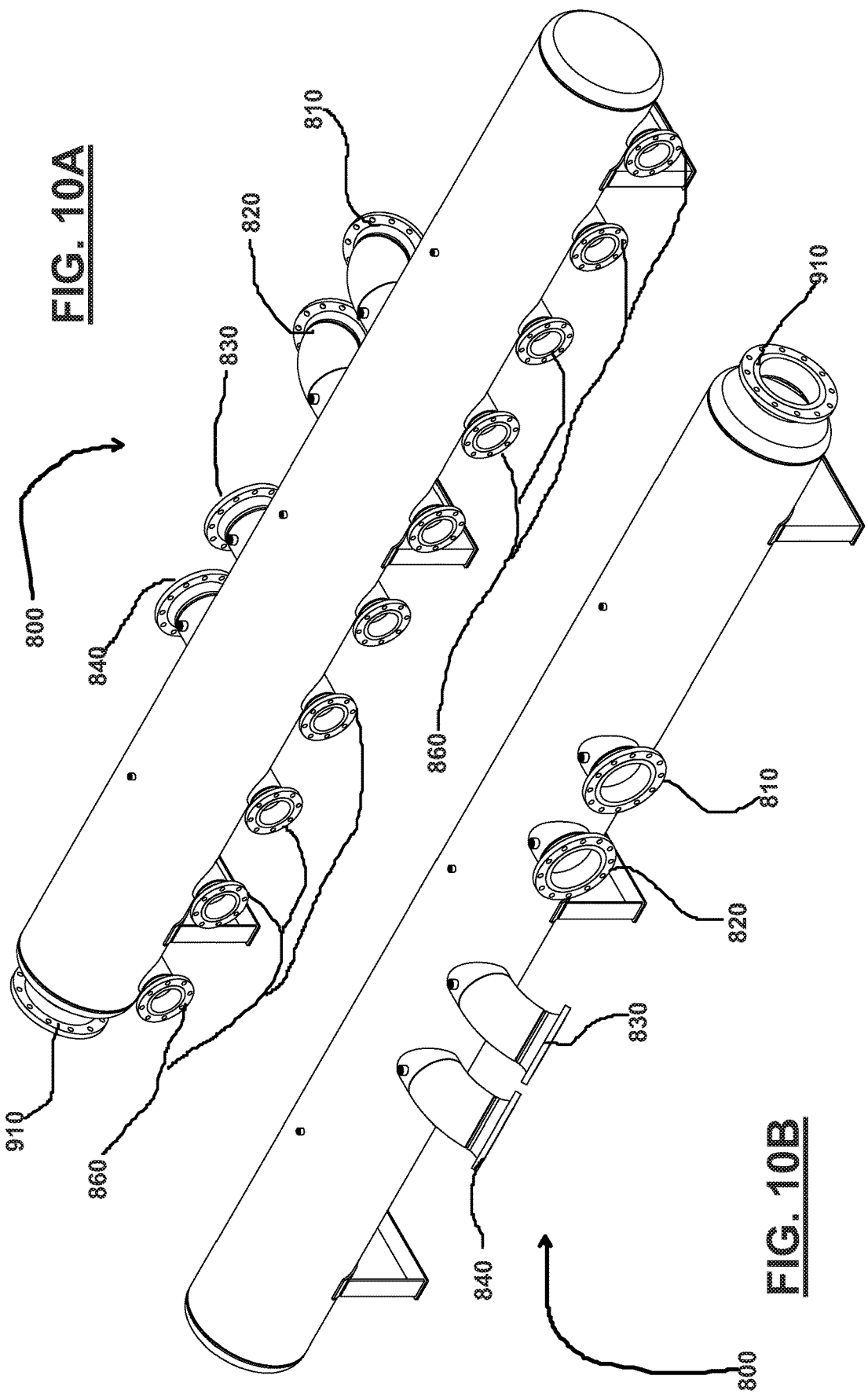
FIGS. 10A and 10B are perspective views of a blending manifold that can be used in various embodiments.
Figure 11:
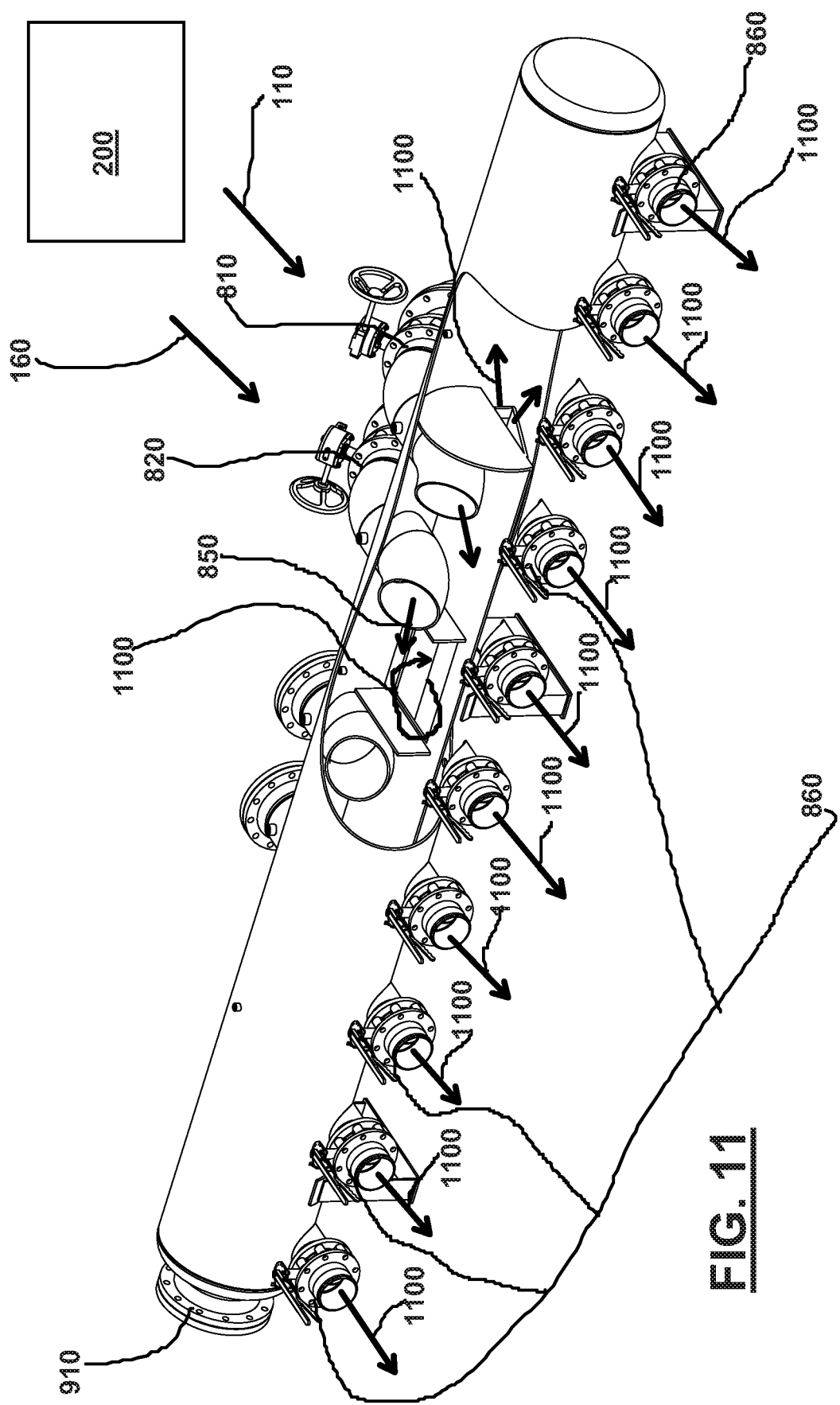
FIG. 11 is a perspective cut away view of the blending manifold of FIG. 10A.

The pressurized fluid streams 115 and 165 can be directed to a blending manifold 800 for blending and mixing these two pressurized fluid streams. FIGS. 10A, 10B and 11 show various views of one embodiment of a blending manifold 800, and this manifold can include inlets 810,820, a mixing/blending interior, and a plurality of outlets 860,861, etc. FIG. 11 is a perspective cutaway view of the blending manifold 800 schematically showing the two separately pressurized fresh and produced water sources 115,165 being blended and/or commingled into a single pressurized source of pressurized blended/commingled fluid 1101. In various embodiments blending manifold 800 can have multiple output connections 860,861,930 for access to this single pressurized source of blended/commingled fluid 1100. The blended/commingled fluid 1101 exiting from the multiple output connections 860,861,930 defines a blended pressurized fluid stream 1100.

As shown in FIG. 1, pressurized stream 110 enters the blending manifold 800 through the inlet 820 and pressurized stream 160 enters the blending manifold 800 through the inlet 810. FIG. 11 shows pressurized stream 110 and pressurized stream 160 entering the blending manifold 800, and mixing together 850 into the pressurized blended fluid stream 1100, and thereafter discharged.

The blended pressurized stream 1100 can be made up the combination of streams 115 and 165. In various embodiments controller 600 determines the relative fraction between stream 115 and 165 in making up the blended pressurized stream 1100. In various embodiments controller 600 can set the fraction of pressurized stream 115 to blended pressurized stream 1100 at 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.5, 96, 96.5, 97, 97.5, 98, 98.5, 99, 99.5, or 100 percent. In various embodiments, In various embodiments controller 600 can set the fraction of pressurized stream 115 to blended pressurized stream 1100 within a range of between any two of the above specified percentages. In various embodiments, the relative fraction of pressurized stream 165 can be equal to 1 minus the fraction of pressurized stream 115, which formula (i.e., 1−fraction of stream 115) will also yield the relative fractional ranges for pressurized stream 165 to blended stream 1100.

Figure 5:
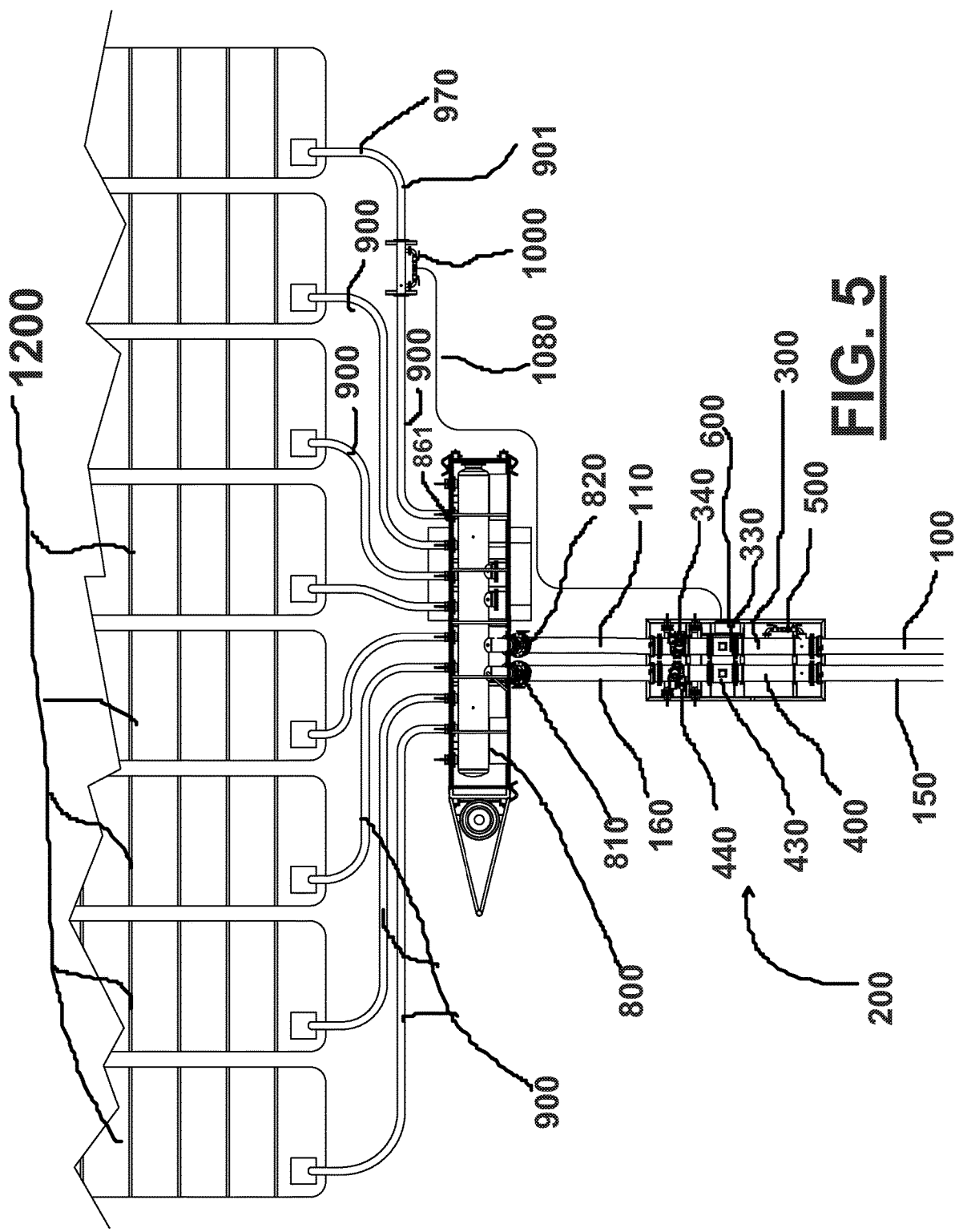
FIG. 5 is a schematic diagram showing a flow controller system discharging into a blending manifold, which in turn discharges into a plurality of tanks.

In various embodiments shown in FIGS. 1 and 5, the blended pressurized stream 1100 can be discharged from the blending manifold 800 for on pad discharge to frac tanks 1200. In this embodiment, FIG. 11 shows the blended water stream 1100 being discharged from the blending manifold 800 through a plurality of outlets 860,861. FIGS. 1 and 5 show the blending manifold 800 being fluidly connected to frac tanks 1200 with a plurality of outlet lines 900,901. The blended water stream 1100 being discharged from the blending manifold 800 through a plurality of outlets 860,861 preferably flow through the plurality of outlet lines 900,901 and into the frac tanks 1200. This embodiment is preferably advantageous for live frac transfers, when providing data to frac personnel on the fly is needed, when there is a need to utilize on pad personnel to operate system, and when the sources of aqueous base fluid 20, 40, 60, 80, 120 are far from each other.

FIGS. 1 and 5 show an embodiment where at least one of the plurality of outlet lines 901 includes a downstream sampling apparatus 1000. The downstream sampling apparatus 1000 is preferably incorporated into the at least one of the plurality of outlet lines 901 such that the at least one of the plurality of outlet lines 901 includes a first section 960, the downstream sampling apparatus 1000, and a second section 970. The first section 960 preferably and fluidly connects the blending manifold 800 to the downstream sampling apparatus 1000, where the blended water stream 1100 exits the outlet 861, flows through the first section 960, and into the downstream sampling apparatus 1000.

Figure 7:
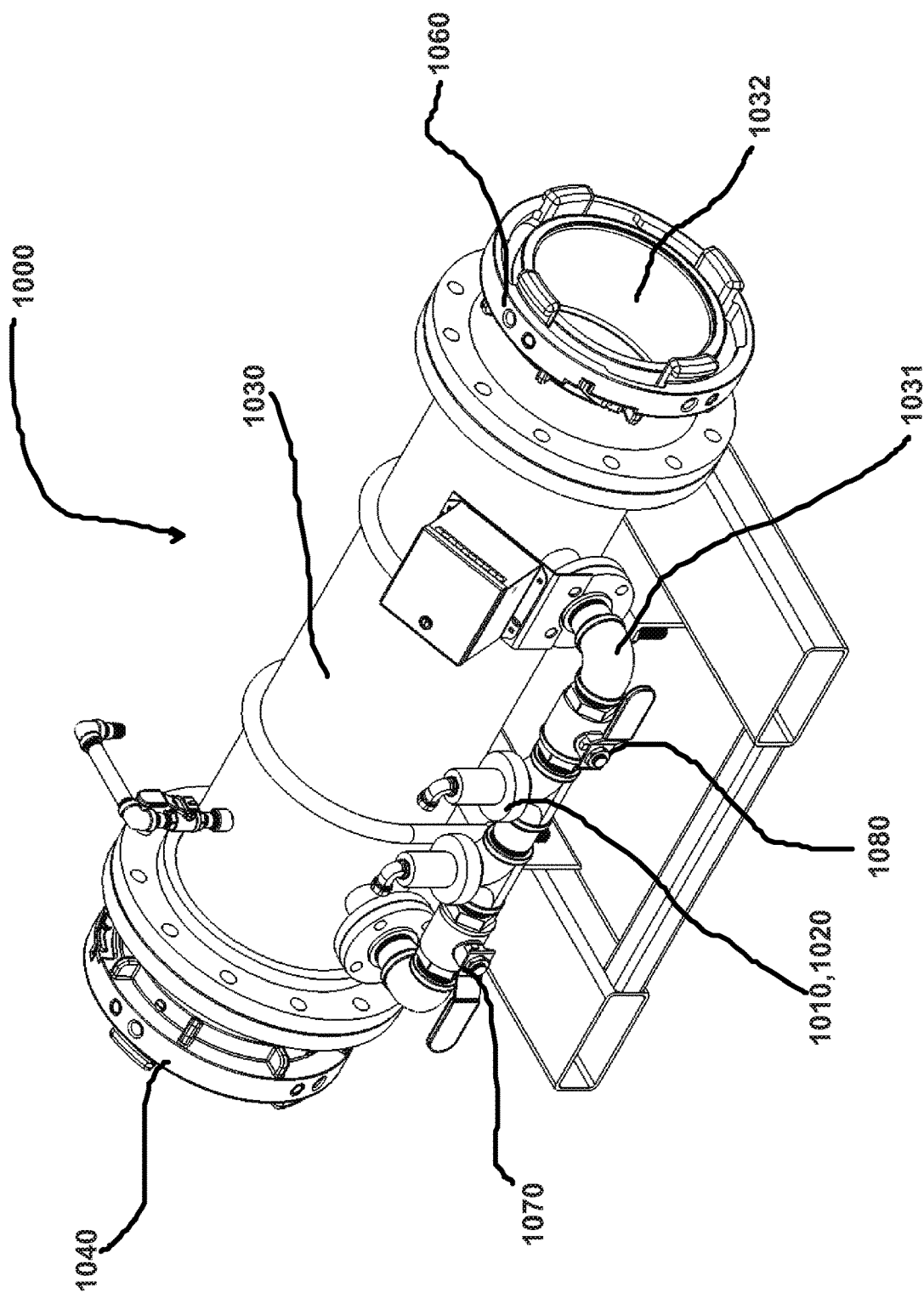
FIG. 7 is a perspective view of sampling piping.
Figure 8:
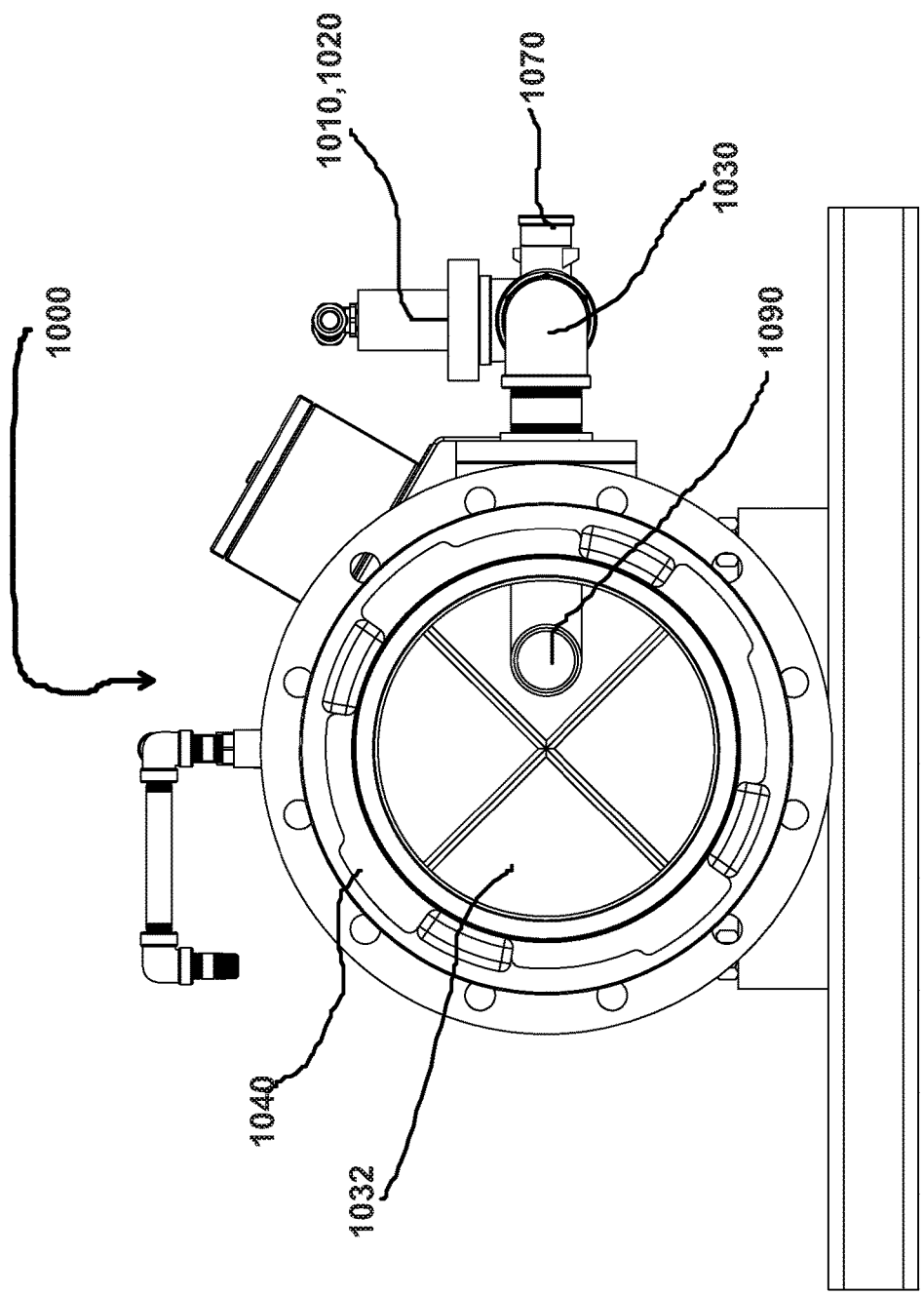
FIG. 8 is an end view of sampling piping.

In various embodiments controller 600 can be operatively connected to a sensor, which sensor measures one or more physical or chemical characteristics of the blended pressurized stream 1100. FIGS. 7 and 8 show views of the downstream sampling apparatus 1000. The downstream sampling apparatus 1000 preferably includes an inlet 1040, piping 1030 having a bore 1032, sampling piping 1031, and an outlet 1060. The blended water stream 1100 flows from the first section 960 and into the piping 1030 via the inlet 1040 and through the bore 1032 and exits the downstream sampling apparatus 1000 via the outlet 1060.

Figure 9:
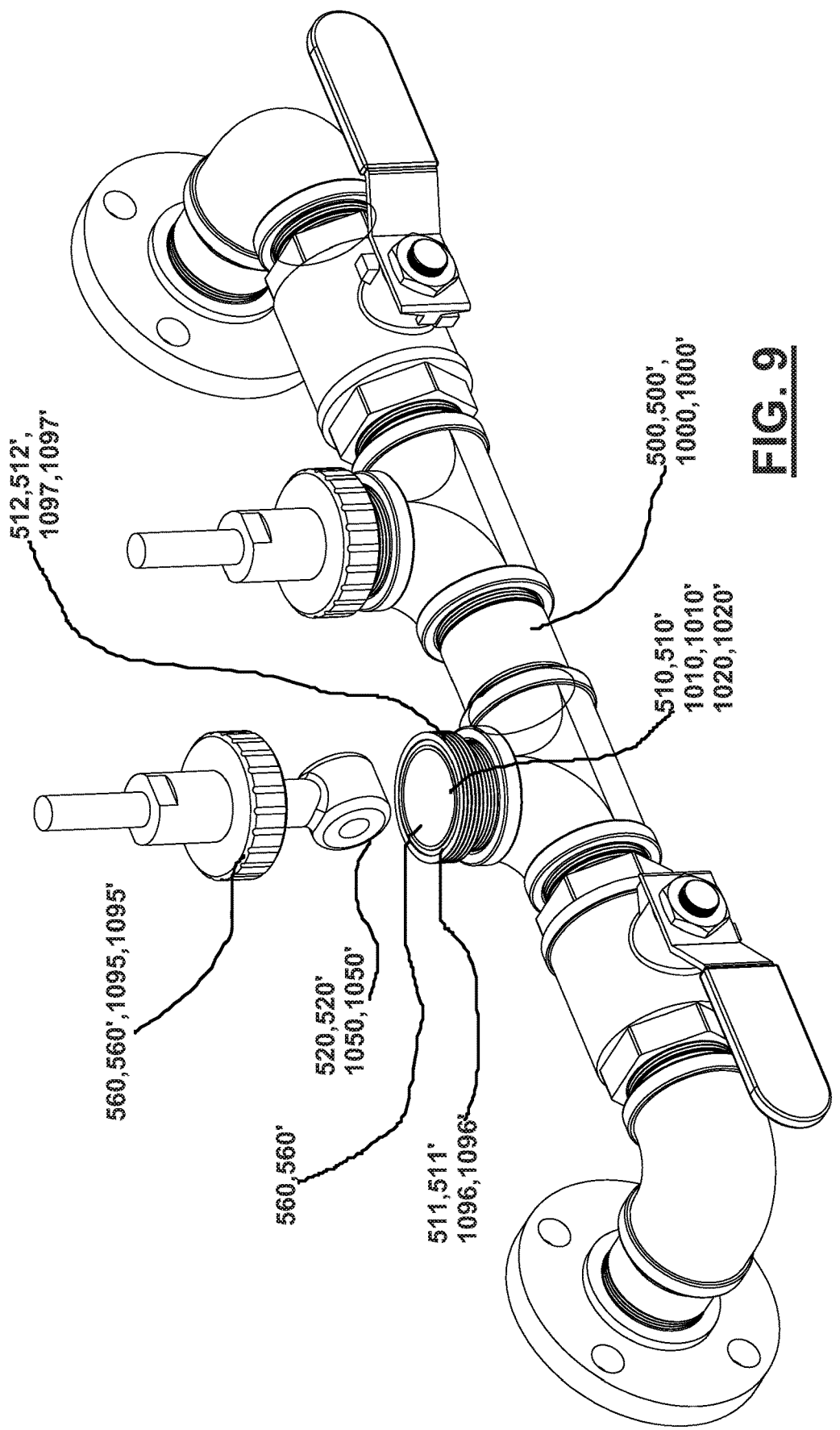
FIG. 9 is a perspective view of a sensor, which can be used in the sampling piping of FIGS. 7 and 8.

A portion of blended pressurized stream 1100 flowing through the piping 1030 may be diverted through the sampling piping 1031 having a bore 1033, where a sensor 1050 extending into the bore 1033 measures physical and/or chemical characteristics of the blended stream 1100 at specified time intervals. FIG. 9 shows a view of the sensor 1050. In one embodiment as shown in FIG. 1, the sampling piping 1031 may include a plurality of sensors 1050. The sensors 1050 preferably measure the physical and/or chemical characteristics of the blended water stream 1100 in timed intervals. In various embodiments sensors 1050 can measure physical or chemical characteristics selected from the group consisting of: pH, oxidation/reduction potential, turbidity/haze, total oxygen demand, viscosity, ionic strength/conductivity, specific chemical and/or metals concentrations, ionic strength/conductivity, specific chemical concentrations, density, crystallization temperature, biocide and/or microbial demand, free and total bromine/chlorine and/or bromine/chlorine residuals, and combinations thereof.

In one embodiment, sensor 1050 can measure the physical and/or chemical characteristics of the blended stream 1100 continuously. In one embodiment, sensor 1050 can be an inductive conductivity sensor. In one embodiment, sensor 1050 can include an ion specific electrode.

In various embodiments sensor 1050 can measure the physical and/or chemical characteristics of the blended water stream 1100 at timed intervals of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds. The sensor 1050 can also measure the physical and/or chemical characteristics of the blended water stream 1100 at timed intervals of 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, the timed interval where sensor 1050 measures the physical and/or chemical characteristics of the blended stream 1100 can fall within a range of between any two of the above specified time intervals.

In various embodiments sampling piping 1031 extends into the bore 1032 of the piping 1030 and includes inlet 1090 for receiving a portion of the blended stream 1100 flowing through the bore 1032 of the piping 1030. The sampling pipe 1031 also includes an outlet 1010,1020 that opens into the bore 1033 and is sized and shaped to receive an adapter 1095 including the sensor 1050 such that the adapter 1095 seals the outlet 1010,1020 and positions the sensor 1050 within the bore 1030 of the sampling piping 1031. In one embodiment as shown in FIG. 1, the sampling piping 1031 may include a plurality of outlets 1010,1020. As shown in FIG. 9, the outlet 1010,1020 preferably has an outer surface and external male threads 1096 on the outer surface near the top of the outlet 1010,1020 and has an annular recess at the top of the outlet 1010,1020 for receiving an annular gasket 1097.

The adapter 1095 preferably has an inner surface and internal female threads on the inner surface near the bottom of the adapter 1095. When the adapter 1095 is screwed onto the outlet 1010,1020, the external male threads 1096 engage the female threads of the adapter 1096 to create a seal 1098.

The sensor 1050 can be removed from the adapter 1095 such that the sensor 1050 can be replaced if it fails.

As the portion of the blended stream 1100 enters through the inlet 1090 and flows through the bore 1033 of the sampling piping 1031, the portion of the blended water stream 1100 preferably flows around and/or through the sensor 1050 and exits the sampling piping 1030 via the outlet 1060, and back into the bore 1032 of the piping 1030.

The sampling piping 1031 may also include a plurality of valves 1070,1080. The valves 1070,1080 are preferably positioned upstream and downstream of the outlet 1010, 1020 and control the flow of the portion of the blended water stream 1100 through the bore 1033 of the sampling piping 1031. The valves 1070,1080 can prevent the portion of the blended water stream 1100 from flowing through the bore 1033 of the sampling piping 1031. The prevention of the portion of the blended water stream 1100 from flowing through the sampling piping 1031 could be used, for example, to allow for the replacement of the sensor 1050 without having to stop the blended water stream 1100 from flowing through the pipping 1030.

The second section 970 preferably and fluidly connects the downstream sampling apparatus 1000 to the frac tanks

1200, where the blended water stream 1100 exits the outlet 1060, flows through the second section 970, and into the frac tanks 1200.

Figure 6:
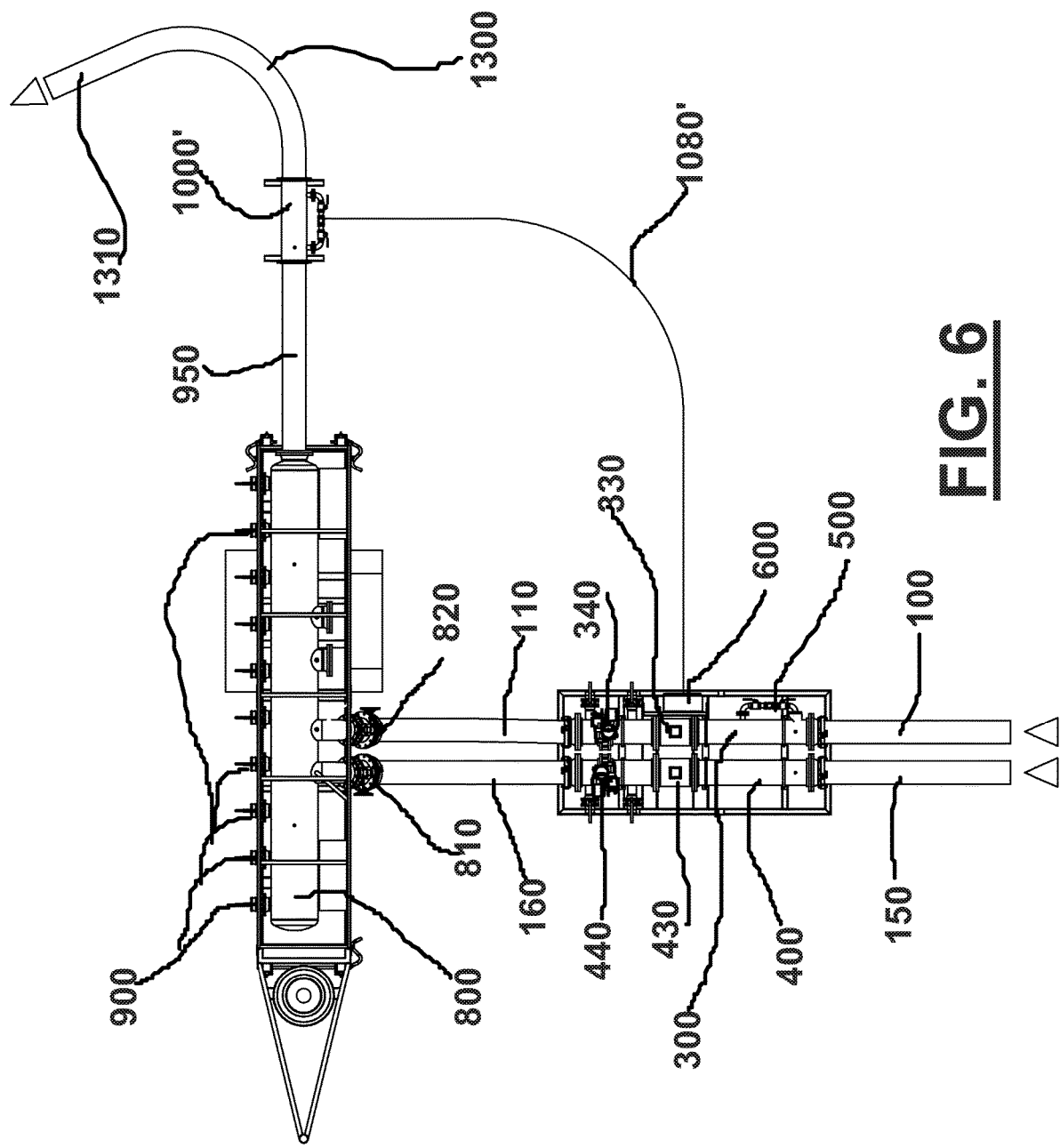
FIG. 6 is a schematic diagram showing a flow controller system discharging into a blending manifold, which in turn discharges into a single effluent line.

In one embodiment shown in FIGS. 1 and 6, the blended water stream 1100 can be discharged from the blending manifold 800 for inline delivery to near sources/destination 1310. In this embodiment, FIG. 1 shows that the blended water stream 1100 is discharged from the blending manifold 800 through an outlet 930 located at an end 910.

FIGS. 1 and 6 show the blending manifold 800 being fluidly connected to frac tanks 1200 via a combination of an outlet line 950 and a line 1300 to the near sources/destination 1310.

The blended stream 1100 being discharged from the blending manifold 800 through an outlet 930 located at an end 910 preferably flows through an outlet line 950 and the line 1300 to the near sources/destination 1310. This embodiment is preferably advantageous for pit to pit transfers and when the sources of aqueous base fluid 20, 40, 60, 80, 120 are near each other. This embodiment preferably prevents the need to deploying multiple flow controller system/apparatus 200 over potentially long distances.

FIGS. 1 and 6 show an embodiment where the blending manifold 800 is fluidly connected via the outlet line 950 to a downstream sampling apparatus 1000', where the blended water stream 1100 exits the outlet 930, flows through the outlet line 950, and into the downstream sampling apparatus 1000'.

FIGS. 7 and 8 show views of the downstream sampling apparatus 1000'. The downstream sampling apparatus 1000' preferably includes an inlet 1040', piping 1030' having a bore 1032', sampling piping 1031', and an outlet 1060'. The blended water stream 1100 flows from the outlet line 950 and into the piping 1030' via the inlet 1040' and through the bore 1032' and exits the downstream sampling apparatus 1000' via the outlet 1060'.

A portion of blended stream 1100 flowing through the piping 1030' may be diverted through the sampling piping 1031' having a bore 1033', where a sensor 1050' extending into the bore 1033' measures physical and/or chemical characteristics of the blended water stream 1100 in time intervals. FIG. 9 shows a view of the sensor 1050'. In one embodiment as shown in FIG. 1, the sampling piping 1031' may include a plurality of sensors 1050'. The sensors 1050' preferably measure the physical and/or chemical characteristics of the blended water stream 1100 in timed intervals. The sensors 1050 can preferably measure but are not be limited to: pH, oxidation/reduction potential, turbidity/haze, total oxygen demand, viscosity, ionic strength/conductivity, specific chemical and/or metals concentrations, ionic strength/conductivity, specific chemical concentrations, density, crystallization temperature, biocide and/or microbial demand, free and total bromine/chlorine and/or bromine/chlorine residuals, and combinations thereof. The sensor 1050', for example, can measure the physical and/or chemical characteristics of the blended water stream 1100 in timed intervals of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds. The sensor 1050', for example, can also measure the physical and/or chemical characteristics of the blended water stream 1100 in timed intervals of 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, the time interval where the sensor 1050' can measure the physical and/or chemical characteristics of the blended water stream 1100 can be within a range of between any two of the above specified time intervals. In one embodiment, the sensor 1050' measures the physical and/or chemical characteristics of the blended water stream 1100 continuously. In one embodiment, the sensor 1050' is an inductive conductivity sensor. In one embodiment, the sensor 1050' includes an ion specific electrode.

The sampling piping 1031' preferably extends into the bore 1032' of the piping 1030' and includes inlet 1090' for receiving a portion of the blended water stream 1100' flowing through the bore 1032' of the piping 1030'. The sampling pipe 1031' also includes an outlet 1010',1020' that opens into the bore 1033' and is sized and shaped to receive an adapter 1095' including the sensor 1050' such that the adapter 1095' seals the outlet 1010',1020' and positions the sensor 1050' within the bore 1030' of the sampling piping 1031'. In one embodiment as shown in FIG. 1, the sampling piping 1031' may include a plurality of outlets 1010',1020'. As shown in FIG. 9, the outlet 1010',1020' preferably has an outer surface and external male threads 1096' on the outer surface near the top of the outlet 1010',1020' and has an annular recess at the top of the outlet 1010',1020' for receiving an annular gasket 1097'.

The adapter 1095' preferably has an inner surface and internal female threads on the inner surface near the bottom of the adapter 1095'. When the adapter 1095' is screwed onto the outlet 1010',1020', the external male threads 1096' engage the female threads of the adapter 1096' to create a seal 1098'.

The sensor 1050' can be removed from the adapter 1095' such that the sensor 1050' can be replaced if it fails.

As the portion of the blended water stream 1100 enters through the inlet 1090' and flows through the bore 1033' of the sampling piping 1031', the portion of the blended water stream 1100 preferably flows around and/or through the sensor 1050' and exits the sampling piping 1030' via the outlet 1060', and back into the bore 1032' of the piping 1030'.

The sampling piping 1031' may also include a plurality of valves 1070',1080'. The valves 1070',1080' are preferably positioned upstream and downstream of the outlet 1010', 1020' and control the flow of the portion of the blended water stream 1100 through the bore 1033' of the sampling piping 1031'. The valves 1070',1080' can prevent the portion of the blended water stream 1100 from flowing through the bore 1033' of the sampling piping 1031'. The prevention of the portion of the blended water stream 1100 from flowing through the sampling piping 1031' could be used, for example, to allow for the replacement of the sensor 1050' without having to stop the blended water stream 1100 from flowing through the pipping 1030'.

The line 1300 preferably and fluidly connects the downstream sampling apparatus 1000' to the near sources/destination 1310, where the blended water stream 1100 exits the outlet 1060' and flows through the line 1300 to the near sources/destination 1310.

Controller 600

The flow controller system/apparatus 200 preferably includes a controller 600. FIGS. 2-4 include various views of the flow controller system/apparatus 200 showing components which include: (a) controller 600, (b) produced and fresh water pipes 300,400, (c) produced and fresh water flow meters 330, 430 operatively connected to the controller 600, and (d) produced and fresh water valves 340, 440 operatively connected to the controller 600.

As shown in FIG. 2, the controller preferably includes a display interface 610, a flow meter converter for the produced water stream 620, and a flow meter converter for the fresh water stream 630.

FIG. 1 shows an embodiment of how controller 600 is incorporated within the system 10. The controller 600 preferably includes one or more non-transitory computer-readable storage media embodying logic that is operable when executed to receive sensing data, analyze the sensing data, and control the operation of the system 10.

The controller 600 receives sensing data including flow rates of streams 100 and 150 and the physical or chemical characteristic(s) of the fluids flowing through the system 10.

For example, FIG. 1 shows that sensor data for the physical or chemical characteristic(s) of the blended water stream 1100 acquired by the sensors 1050,1050' are preferably transmitted to the controller 600 via sampling apparatus sensor lines 1080, 1080'.

For example, FIG. 1 shows that sensor data for the physical or chemical characteristic(s) of either the produced or fresh water stream flowing through the pipes 300,400 and acquired by the sensors 520,520' are preferably transmitted to the controller 600 via sensor lines 530,530'.

For example, FIG. 1 shows that the data of flow rate measurements of either the produced or fresh water stream flowing through the pipes 300,400 and acquired by the flow meters 330,430 are preferably transmitted to the controller 600 via flow meter lines 350, 430. In one embodiment, the data as indicated above may be transmitted wirelessly.

Based on the data regarding the physical or chemical characteristic(s) of either the produced or fresh water stream 115,165 and/or the blended water stream 1100 received from the sensors 520,520',1050,1050' and flow rates of either the produced or fresh water stream 115,165 from the flow meters 330,440, the controller 600 can selectively control the amount of opening and/or closing of the plurality of valves 340,440 that are operatively configured to alter the flow rates of the produced and fresh water streams 115,165.

As shown in FIG. 1, the controller 600 can operatively connected to valves 340,440 by valve control lines 360,460. In various embodiments controller 600 controls valves 340, 440 to alter the flow rates of either pressurized stream 115 or 165 by up to 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 40, 40.5, 41, 41.5, 42, 42.5, 43, 43.5, 44, 44.5, 45, 45.5, 46, 46.5, 47, 47.5, 48, 48.5, 49, 49.5, or 50 percent. In various embodiments, the percentage valve 340 alters the flow rates of its connected stream 115 can be within a range of between any two of the above specified percentages. In various embodiments, the percentage valve 440 alters the flow rates of its connected stream 165 can be within a range of between any two of the above specified percentages. In various embodiments the altered percentage flow rates of the two streams 115 and/or 165 can be different from each other.

In various embodiments, even after alteration of flow rates in stream 115 and/or stream 165, the flow rate of blended stream 1100 can remain within a predefined range from the target flow rate of pressurized blended stream 1100. In various embodiments, after alteration of flow rates in stream 115 and/or stream 165, the flow rate of blended stream 1100 can be changed to a new target flow rate, and fall within a predefined limit from the new target flow rate. For example, the new target flow rate of pressurized blended stream 1100 can be increased by 15 percent over an earlier target flow rate (e.g., the pressurized flow through stream 115 is increased by 15 percent of the pressurized blended flow of blended stream 1100).

In various embodiments controller 600 decides, determines, and sends a controlling signal to alter the flow rates in either pressurized stream 115 and/or 165 by controlling valve 340 and/or valve 440 within selected timed intervals. In various embodiments the selected timed intervals can be 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds. In various embodiments the selected timed intervals can be 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, the selected timed intervals can fall within a range of between any two of the above specified selected time intervals.

Controller 600 Changing Pumping Feed Rates

In various embodiments controller 600 can be operatively connected to one or more of the pumps 30 and/or 130; and can selectively alter the feed pump rates of one or more of these pumps 30 and/or 130. FIG. 1 shows that the controller 600 is operatively connected to the pumps 30 and/or 130 by respective pump control lines 31 and/or 131.

The pumps 30 and/or 130 can preferably alter the flow rates of either pressurized streams 115 and/or 165 by 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 33, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 40, 40.5, 41, 41.5, 42, 42.5, 43, 43.5, 44, 44.5, 45, 45.5, 46, 46.5, 47, 47.5, 48, 48.5, 49, 49.5, or 50 percent. In various embodiments, the percentage the pumps 30 and/or 130 can alter the flow rates of the either pressurized stream 115 and/or 165 within a range of between any two of the above specified percentages.

In various embodiments, the controller 600 can alter both the position of the plurality of valves 340,440 and feed pump rates of the pumps 30 and/or 130 together.

The controller's 600 selective control of the plurality of valves 340,440 and feed pump rates of the pumps 30 and/or 130 preferably allows for separate control of the flow rates of the produced or fresh water stream 115,156.

Figure 12A:
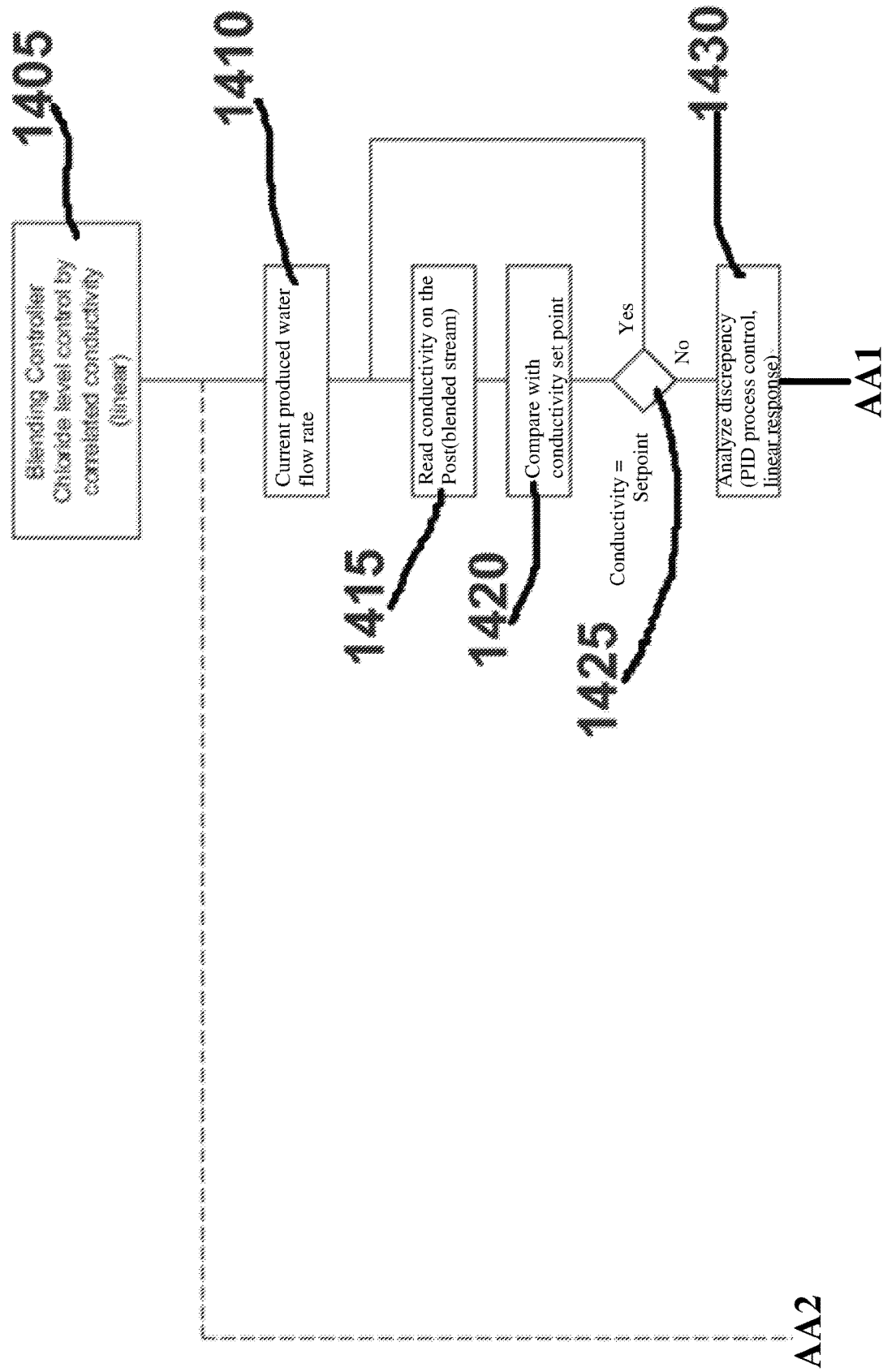
FIGS. 12A, 12B 12C, and 12D are a flowchart of the method steps of one embodiment of the method and apparatus.
Figure 12B:
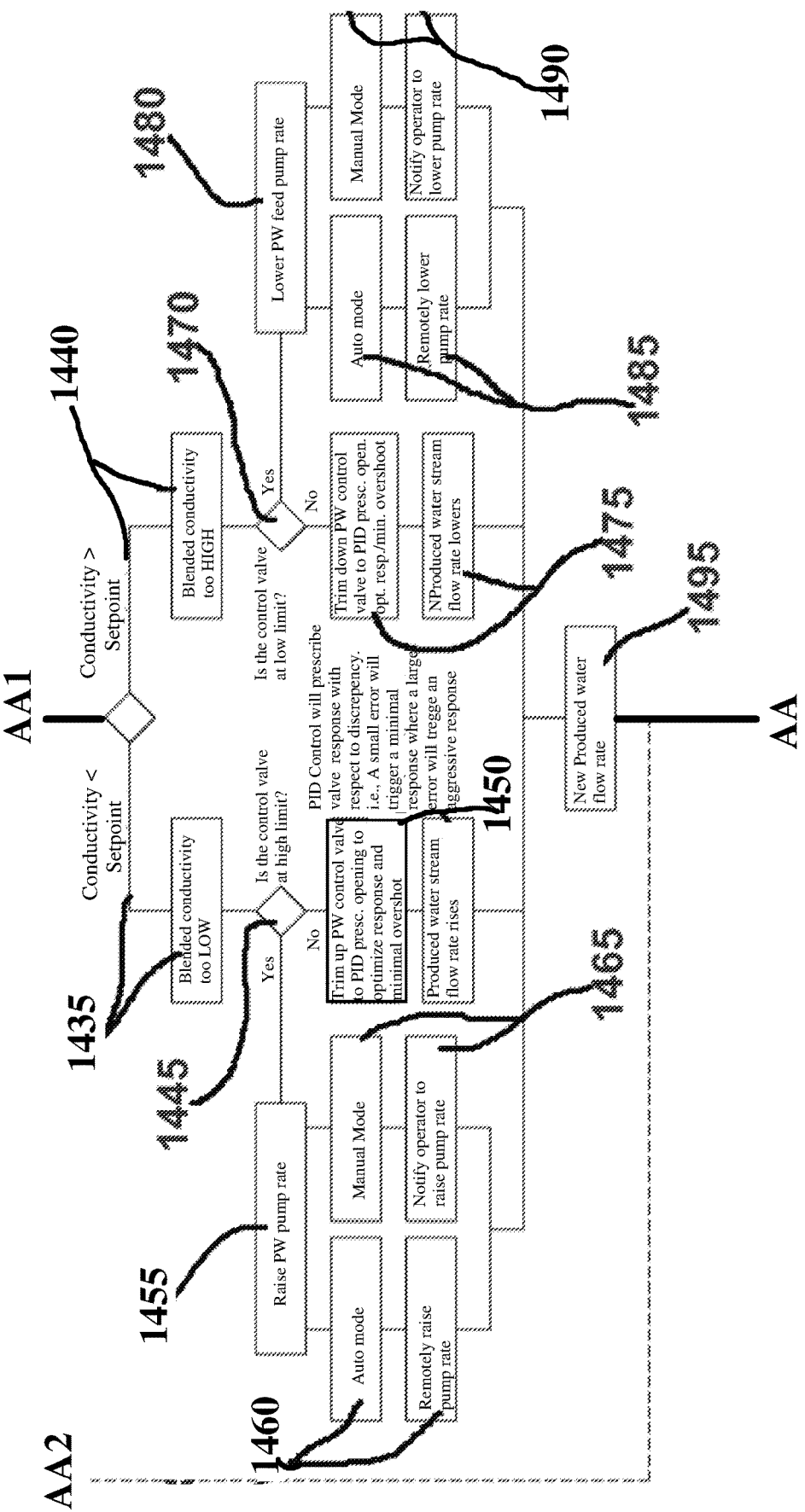
Figure 12C:
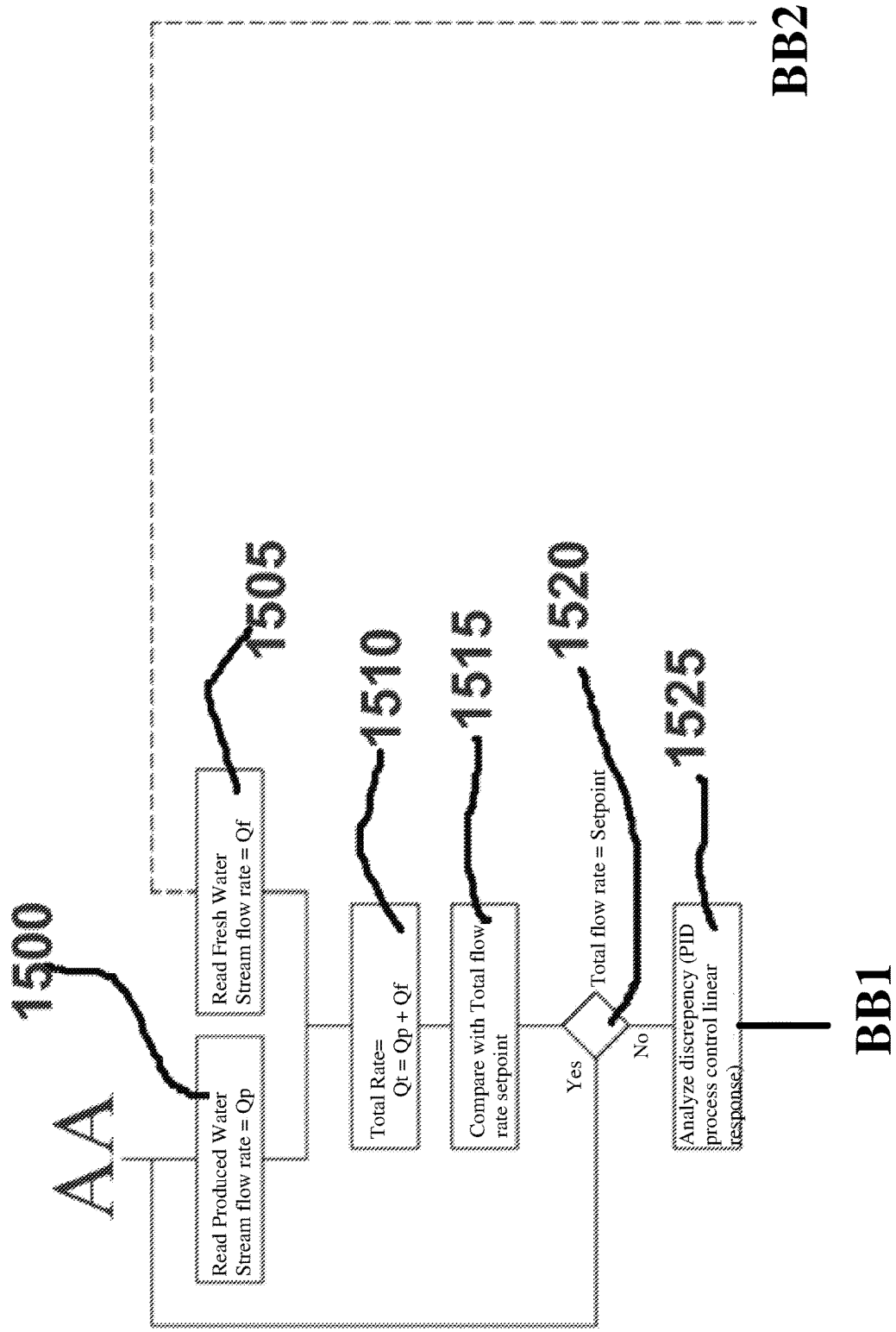
Figure 12D:
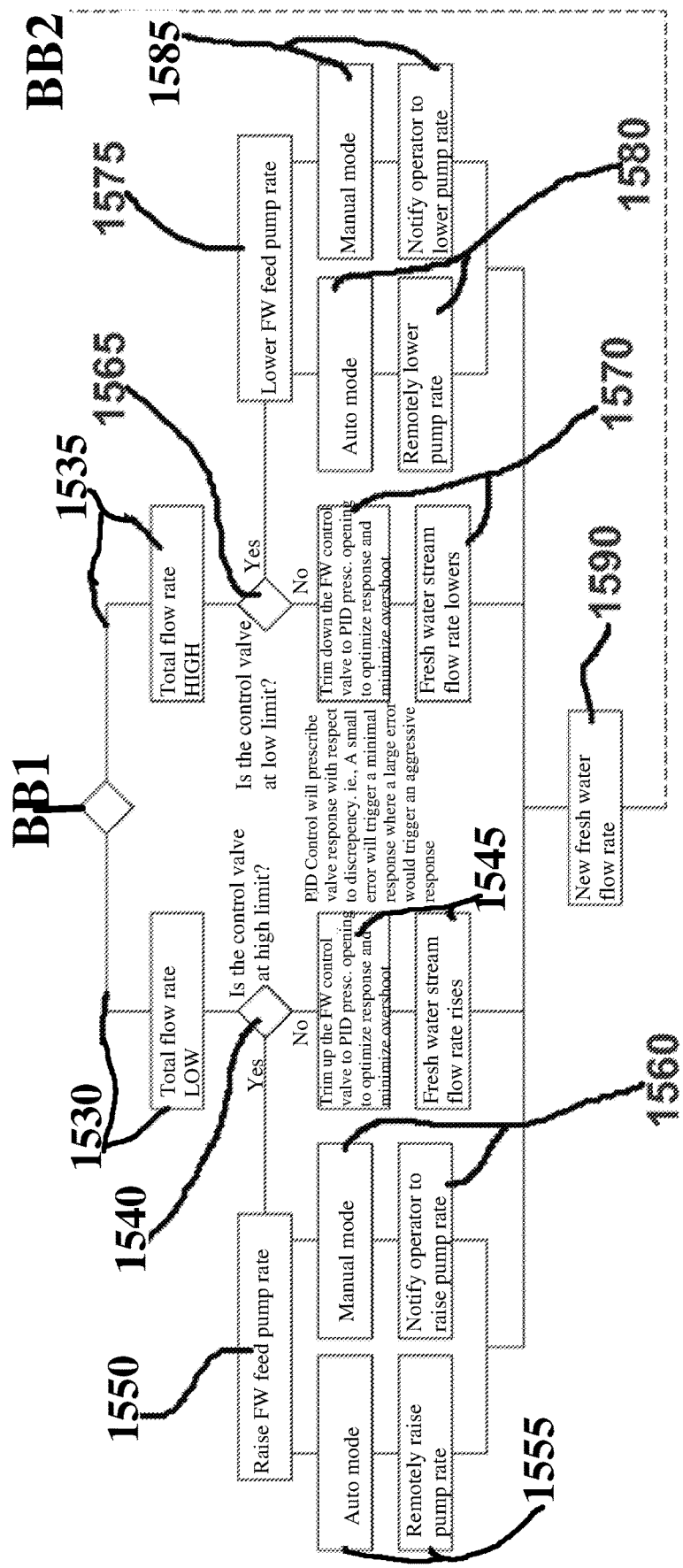

The controller 600 can preferably analyze data regarding but is not be limited to: pH, oxidation/reduction potential, turbidity/haze, total oxygen demand, viscosity, ionic strength/conductivity, specific chemical and/or metals concentrations, ionic strength/conductivity, specific chemical concentrations, density, crystallization temperature, biocide and/or microbial demand, free and total bromine/chlorine and/or bromine/chlorine residuals, and combinations thereof. In a more preferred embodiment, the controller has a control loop feedback mechanism such as a proportional-integral-derivative (PID) process control as shown in FIGS. 12A and 12B.

In various embodiments, the system 10 may further include apparatuses for, but not limited to: pH buffering, viscosity modification such as the addition of polymers/viscosifiers to increase viscosity or break polymers/viscosifiers in the fluid to decrease viscosity, filtration, anti-microbial treatment including one or more oxidizing and/or non-oxidizing biocides/antimicrobials, metal contamination treatment(s), ionic strength adjustment, and or adding crystallization inhibitors. For example, the system 10 may further include, but is not limited to, apparatuses for dispensing disinfectant, sanitizer, slimicide, bactericide, algaecide, fungicide and molluscicide such as BIORID™ solutions.

FIGS. 12-13 show embodiments that outline processes that the controller 600 applies in operation of the system 10.

FIGS. 12A, 12B 12C, and 12D show embodiments and examples of the system 10 for assessing chloride concentrations in the blend water stream 1100 and/or altering the chloride concentrations by varying flow rates of the produced and water streams 115,165 to provide the blend water stream 1100 with a particular chloride concentration.

Figure 13A:
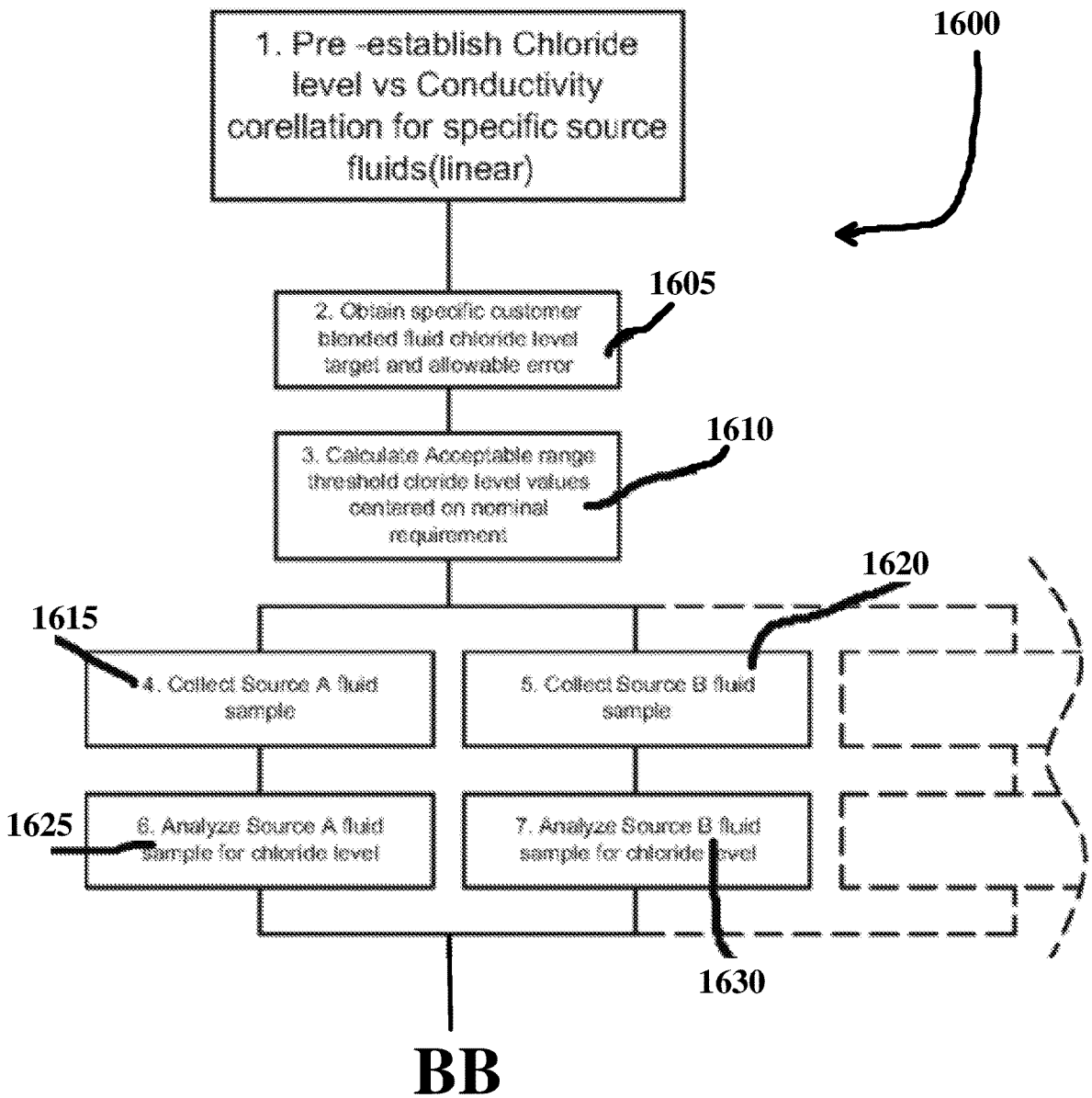
FIGS. 13A and 13B are is a flowchart of the method steps of a third embodiment of the method and apparatus.
Figure 13B:
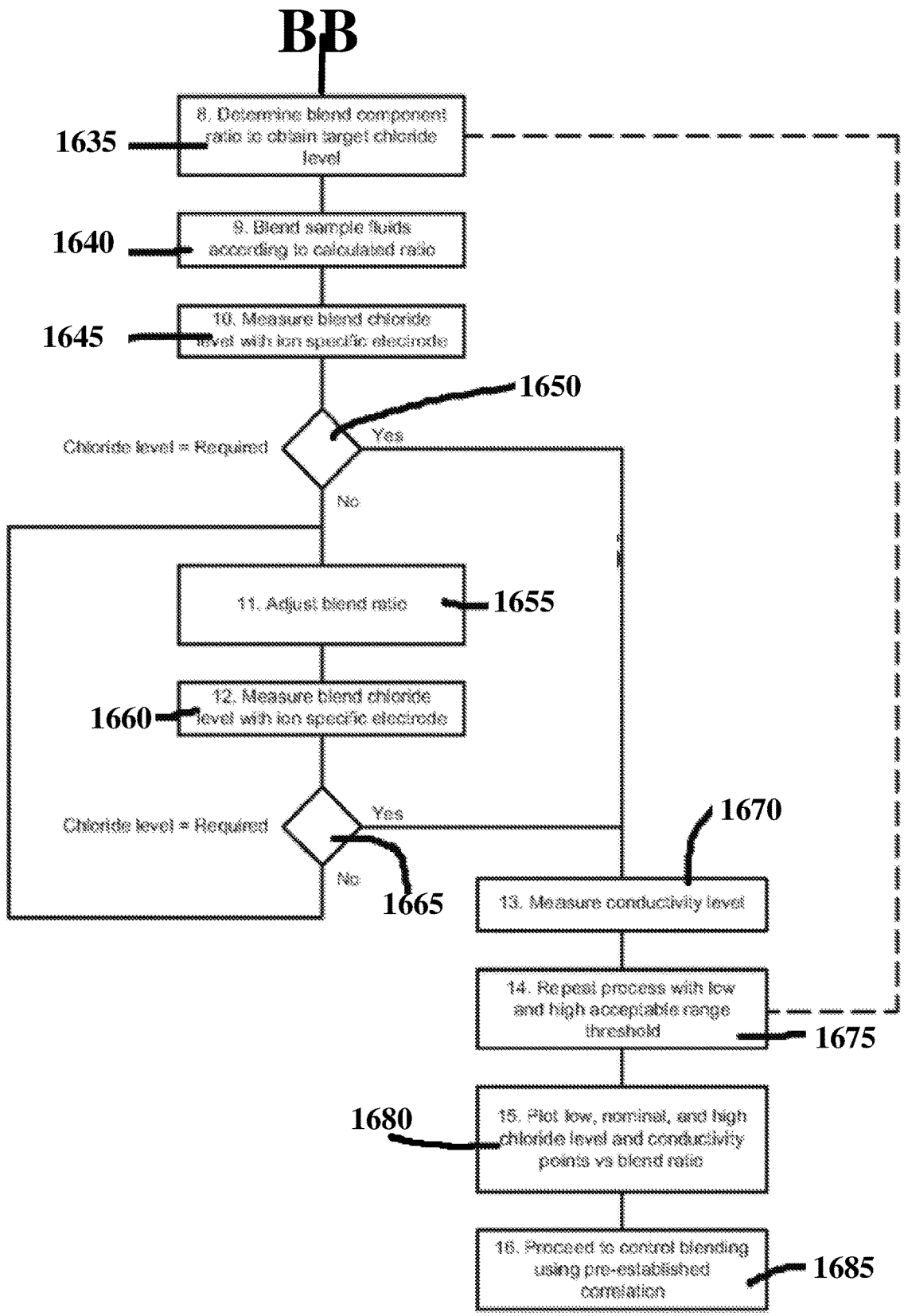

FIGS. 13A and 13B shows an embodiment and example of establishing a correlation between physical or chemical characteristic(s) and the measurements to be conducted by the sensors 520, 520', 1050, 1050' prior to method outlined in FIGS. 12A, 12B 12C, and 12D. Prior to engaging the pumps 30 and/or 130 to pump fluids from the sources of aqueous base fluid 20,40,60,80,120, the water quality specification such as the chloride concentration for blended/commingled aqueous fluid/water 1101 and flow rates for the blended water stream 110 are preferably determined (step 1605). Acceptable range values centered on a nominal requirement are preferably calculated from the water quality specification such as the chloride concentration for blended/commingled aqueous fluid/water 1101 (step 1610). Samples of the fluids from the sources of aqueous base fluid 20,40, 60,80,120 are preferably extracted (steps 1615 and 1620). For example, the extracted samples include a produced water sample 1615 that is representative of the produced water stream 115 and a fresh water sample 1620 that is representative of the fresh water stream 165. The extracted samples of the fluids from the sources of aqueous base fluid 20,40,60,80,120 are preferably representative of the sources of aqueous base fluid 20,40,60,80,120. The extracted samples of the fluids from the sources of aqueous base fluid 20,40,60,80,120 are preferably analyzed to establish a correlation between physical or chemical characteristic(s) and the measurements to be conducted by the sensors 520, 520', 1050, 1050' (steps 1625 and 1630). For example, the produced and fresh water samples are analyzed to correlate conductivity of the samples, which is preferably what the sensors 520, 520', 1050, 1050' measure, to chloride concentration.

In this example, the chloride concentration and conductivity of the produced and fresh water samples are determined and a theoretical blend ratio is calculated to obtain the chloride concentration quality specification for blended/commingled aqueous fluid/water 1101 (step 1635). At least a portion of the produced and fresh water samples 1615, 1620 are mixed together to according to the theoretical blend ratio, where the chloride concentration and conductivity of the mixed sample is determined (steps 1640 and 1645). If there is a discrepancy 1650 between chloride concentration of the mixed sample and the chloride concentration of the water quality specification, the blend ratio of produced and fresh water samples 1615,1620 may be adjusted to achieve the chloride concentration of the water quality specification where the conductivity of the adjusted blend ratio is assessed (steps 1655 and 1660). The method of steps 1655 and/or 1660 can be repeated in order to get the chloride concentration equal to the water quality specification (step 1665). Once the adjusted blend ratio of produced and fresh water samples 1615,1620 have a chloride concentration equal to the water quality specification, the conductivity of the adjusted blend ratio of produced and fresh water samples 1615,1620 is measured (step 1670). The theoretical blend ratio may also be adjusted/fine-tuned and portions of the produced and fresh water samples are mixed according to these adjusted theoretical blend ratio to create blends for determining acceptable low and high threshold ranges (step 1675). The chloride concentration and conductivity of the blends and the blend ratio of produced and fresh water samples 1615,1620 have a chloride concentration equal to the water quality specification are used to establish a correlation between the chloride concentration and conductivity (step 1680). The correlation is statistically analyzed to preferably assess the strength of the correlation. For example with chloride concentration and conductivity, the linearity of the correlation is tested. The correlation and set points for conductivity and flow rates are preferably entered into the controller 600 (step 1685).

FIGS. 12A, 12B 12C, and 12D show the steps of one embodiment and example of the system 10 for assessing chloride concentrations in the blend water stream 1100 and/or altering the chloride concentrations by varying flow rates of the produced and water streams 115,165 to provide the blend water stream 1100 with a particular chloride concentration. Based on the correlation and set points for conductivity and flow rates, the controller 600 engages the pumps 30 and/or 130 to pump fluids from the sources of aqueous base fluid 20,40,60,80,120 into the produced and fresh water streams 115,116 and sets the valves 340,440 to a position (step 1405). As the produced and fresh water flows through the bores 301,401 of the produced and fresh water pipe, the flow meters 330,430 measure the flow rates of the produced and fresh water streams 115,165 in timed intervals and transmits the measurements to the controller 600 (step 1410).

The sensors 1050,1050' measure the conductivity of the blended water stream 1100 and transmits the measurements to the controller 600 (step 1415), where the controller 600 analyzes the conductivity measurements by comparing the measurements to the conductivity set point (step 1420). If there is a discrepancy between the conductivity measurements and conductivity set point 1425, the controller 600 further analyzes the discrepancy and determines whether the conductivity measurements are either less than 1435 or greater than 1440 the conductivity set point (step 1430).

If the conductivity measurements are less than 1435 the conductivity set point, the controller determines whether the valve 340 regulating the flow rate of the produced water stream 115 is at a position for a high limit flow rate relative to the feed pump rate (step 1445). If the valve 340 is not at the high limit position, the controller 600 changes the position 340 of the valve to increase the flow rate of the produced water stream 115 (step 1450). If the valve 340 is at the high limit position, the controller 600 increases the feed pump rate to increase the flow rate of the produced water stream 115 (step 1455). The controller 600 preferably has a plurality of modes including an automatic mode 1412 and a manual mode 1413. In the automatic mode, the controller 600 directly increases the feed pump rate (step 1460). In the manual mode, the controller 600 notifies an operator to increase the feed pump rate (step 1465).

If the conductivity measurements are greater than 1440 the conductivity set point, the controller determines whether the valve 340 regulating the flow rate of the produced water stream 115 is at a position for a low limit flow rate relative to the feed pump rate (step 1470). If the valve 340 is not at the low limit position, the controller 600 changes the position 340 of the valve to decrease the flow rate of the produced water stream 115 (step 1475). If the valve 340 is at the low limit position, the controller 600 decreases the feed pump rate to decrease the flow rate of the produced water stream 115 (step 1480). The controller 600 preferably has a plurality of modes including an automatic mode 1485 and a manual mode 1490. In the automatic mode, the controller 600 directly decreases the feed pump rate (step 1485). In the manual mode, the controller 600 notifies the operator to decrease the feed pump rate (step 1490).

The controller 600 as indicted in FIGS. 12A, 12B 12C, and 12D preferably prescribes either a valve 340 response or a feed pump rate response 1455,1480 relative to the discrepancy 1435,1440. For example, greater differences between the conductivity measurements and conductivity set point result in a greater valve 340 or feed pump rate responses 1455,1480 and smaller differences between the conductivity measurements and conductivity set point result in a smaller valve 340 or feed pump rate responses 1455, 1480.

Any change in the position of the valve 340 or feed pump rate preferably results in a change in the flow rate of the produced water stream 115, which preferably results in a change in the flow rate of the blended water stream 1100 (step 1495). Any change in the flow rate of the produced water stream 115 is measured by the flow meter 330, where the flow rate measurement is transmitted to the controller 600 (step 1500). The flow rate of the fresh water stream 165 is also preferably measured by the flow meter 430 and transmitted to the controller 600 (step 1505). In various embodiments, the controller 600 can alter both the position of the plurality of valves 340,440 and feed pump rates of the pumps 30,50,70,90,130 together attain the set points for conductivity and flow rates for the blended water stream 1100.

In one embodiment, the controller 600 combines the flow rates of the produced water stream 115 and fresh water stream 165 into a total flow rate (step 1510). Alternatively, the total flow rate can also be the flow rate of the blended water stream 1100. The controller 600 compares the total flow rate to the flow rate set point (step 1515). If there is a discrepancy 1520 between the total flow rate to the flow rate set point, the controller 600 further analyzes the discrepancy 1520 and determines whether the total flow rate is either less than 1530 or greater than 1535 the flow rate set point (step 1525). In various embodiments an actual blended stream flow meter can be used.

If the total flow rate is less than 1530 the flow rate set point, the controller 600 determines whether the valve 340,440 regulating the flow rates of the produced and/or fresh water streams 115,165 is at a position for a high limit flow rate relative to the feed pump rate (step 1540). If the valve 340,440 is not at the high limit position, the controller 600 can change the position of the valve 340,440 to either increase or decrease the flow rate of the produced and/or fresh water streams 115,165 (step 1545). If the valve 340, 440 is at the high limit position, the controller 600 can increases the feed pump rate to increase the flow rate of the produced and/or fresh water stream 115,165 (step 1550). The controller 600 preferably has a plurality of modes including an automatic mode 1555 and a manual mode 1560. In the automatic mode, the controller 600 directly increases the feed pump rate (step 1555). In the manual mode, the controller 600 notifies an operator to increase the feed pump rate (step 1560).

If the total flow rate is greater than 1535 the flow rate set point, the controller determines whether the valve 340,440 regulating the flow rate of the produced and fresh water stream 115,165 are at a position for a low limit flow rate relative to the feed pump rate (step 1565). If the valve 340,440 is not at the low limit position, the controller 600 can change the position of the valve 340,440 to decrease the flow rate of either the produced water stream 115 or fresh water stream 165 (step 1570). If the valve 340,440 is at the low limit position, the controller 600 can decrease the feed pump rate to decrease the flow rates of the produced and/or fresh water stream 115,165 (step 1575). The controller 600 preferably has a plurality of modes including an automatic mode 1580 and a manual mode 1585. In the automatic mode, the controller 600 directly decreases the feed pump rate (step 1580). In the manual mode, the controller 600 notifies the operator to decrease the feed pump rate (step 1585).

The controller 600 as indicted in FIGS. 12A, 12B 12C, and 12D preferably prescribes either a valve 340,440 response or a feed pump rate response 1550,1575 relative to the discrepancy 1530,1535. For example, greater differences between the total flow rate and flow rate set point results in a greater valve 340,440 or feed pump rate responses 1550, 1575 and smaller differences between the total flow rate and flow rate set point result in a smaller valve 340,440 or feed pump rate responses 1550,1575. The changes in the flow rates of either the produced water stream 115 or fresh water stream 165 preferably result in a total flow rate that is preferably equal to the flow rate set point (step 1590). In various embodiments, the controller 600 can alter both the position of the plurality of valves 340,440 and feed pump rates of the pumps 30 and/or 130 together attain the set points for conductivity and flow rates for the blended water stream 1100.

Determining Starting Ratios of Flow Rates

In various embodiments the method and apparatus 10 can determine an initial starting fractional percentage for pressurized streams 115 and 165 in making up blended fluid stream 1100. In various embodiments an arbitrary starting fractional percentage can be selected (e.g., 50/50) and the method and apparatus 10 can be used to modify the fractional percentages of pressurized streams 115 and 165 to achieve the target predefined physical or chemical characteristic of blended fluid stream 1100.

Example 1: Determining Starting Ratios

Prior to operation of the system, set points for a value preferably related a physical and/or chemical characteristic data for the wellbore fluid (which can be a fracturing fluid) and a flow rate for the fracturing fluid are preferably determined. The physical and/or chemical characteristic data and flow rate preferably refer to blended/commingled aqueous fluid/water 1101 of the blended stream 1100. To this extent, a starting ratio of flow rates for pressurized stream 115 and pressurized stream 165 can be calculated and applied in starting operation of the system 10 to preferably achieve the target predefined physical or chemical characteristic of blended fluid stream 1100.

The actual values of the physical and/or chemical characteristic data of pressurized streams 115 and 165 (compared to the target predefined physical or chemical characteristic of blended fluid stream 1100) are preferably determined via testing of the sources for these streams (or these streams themselves). Alternatively, the values of the physical and/or chemical characteristic data of pressurized streams 115 and 165 can be assumed.

In determining the starting fractions/ratios of flow rates of pressurized streams 115 and 165, controller 600 can use the following equations:

$$(V_{stream\ 115} \times F_{stream\ 115}) + (V_{stream\ 165} \times F_{stream\ 165}) = V_{blended\ stream}$$

Where $V_{stream\ 115}$, $V_{stream\ 165}$ are the actual values of the physical and/or chemical characteristic data of pressurized streams 115 and 165, and $V_{blended\ stream}$ is the target predefined physical or chemical characteristic of blended fluid stream 1100 such as chloride levels or pH values.

Additionally, $F_{stream\ 115}$ and $F_{stream\ 165}$ are the fractions of the particular flow rates of streams 115 and 165 compared to the combined flow rate of blended stream 1100 so that:

$$F_{stream\ 115} + F_{stream\ 165} = 1 \text{ and } 1 - F_{stream\ 115} = F_{stream\ 165}.$$

To determine the starting $F_{stream\ 115}$: the following derivation can be made:

$$(V_{stream\ 115} \times F_{stream\ 115}) + (V_{stream\ 165} \times (1 - F_{stream\ 115})) = V_{blended\ stream};$$

$$F_{stream\ 115} = (V_{blended\ stream} - V_{stream\ 165}) / (V_{stream\ 165} - V_{stream\ 115})$$

$$F_{stream\ 16} = 1 - F_{stream\ 115}$$

For example:
If $V_{blendedstream} = 35{,}000$ ppm of chloride, $V_{stream\ 115} = 175{,}000$ ppm of chloride, and $V_{stream\ 165} = 1000$ ppm of chloride; then $F_{stream\ 115} = 0.20$ and $F_{stream\ 165} = 0.80$.

To get a blended water stream 1100 having 35,000 ppm of chloride with a flow rate of 90 BBL/min, the flow rate of the produced water stream 115 should be 18 BBL/min and the flow rate of the fresh water stream 165 should be 72 BBL/min.

In various embodiments, users can input upstream of the flow the ratio of recognized values for the produced water stream 115 and fresh water stream 165 to be controlled.

In other embodiment, sensors can be used to acquire measurements of the values for the produced water stream 115 and fresh water stream 165 to be sent to the controller 600.

In other embodiment, the values to be controlled are preferably determined by sensing a proxy value (i.e. conductivity for chloride amount). In these embodiments, a transposition table for transposing operation can be determined between the value to be controlled and the proxy value that is being measured.

Example 2: Changing Ratios

In another example when the system 10 is in operation, the $V_{blended\ stream}$ does not equal the value set point for the blended water stream 1100 preferably entered into the controller 600. In cases such as these, the flow rates of the produced water stream 115 and fresh water stream 165 may need to be altered in order for the $V_{blended\ stream}$ to equal the value set point for the blended water stream 1100. The discrepancy between the $V_{blended\ stream}$ and value set point can be understood to be:

$$V_{blended\ stream\ set\ point} - V_{blended\ stream} = \Delta V_{blended\ stream}$$

Also, $F_{stream\ 115} - F_{stream\ 165} = \Delta F_{streams}$ $$(V_{stream\ 115} \times \Delta F_{streams}) - (V_{stream\ 165} \times \Delta F_{streams}) = \Delta V_{blended\ stream}$$

$$\Delta F_{streams}(V_{stream\ 115} - V_{stream\ 165}) = \Delta V_{blended\ stream}$$

$$\Delta F_{streams} = \Delta V_{blended\ stream} / (V_{stream\ 115} - V_{stream\ 165})$$

For example:
If $V_{blended\ stream\ set\ point} = 35{,}000$ ppm of chloride and $V_{blended\ stream} = 10{,}000$ ppm of chloride, then $\Delta V_{blended\ stream} = 25{,}000$ ppm
If $V_{stream\ 115} = 175{,}000$ ppm of chloride, and $V_{stream\ 165} = 1000$ ppm of chloride, then $\Delta F_{streams} = 0.14$
If the system 10 had $F_{stream\ 115} = 0.20$ and $F_{stream\ 165} = 0.80$, the controller 600 or an operator would change the flow rates of the produced water stream 115 and fresh water stream 165 such that $F_{stream\ 115} = 0.34$ and $F_{stream\ 165} = 0.66$.

In other embodiments, changing the flow rates of the produced water stream 115 and fresh water stream 165 to attain a blended water stream 165 having a value preferably equal to the value set point is accomplished through iterative manipulation of the flow rates of the produced water stream 115 and fresh water stream 165. In various embodiment, the iterative manipulation of the flow rates of the produced water stream 115 and fresh water stream 165 may be accomplished by the position of the plurality of valves 340,440 and/or feed pump rates of the pumps 30,50,70,90, 130. In various embodiment, the iterative manipulation by selective control via the controller 600 and/or an operator.

Optional Sensors on Flow Controller System/Apparatus

In various embodiments flow controller system/apparatus 200 can optionally include sampling capability for fluid flowing through one or both of pipes 300 and/or 400. In various embodiments a sampling piping 500 can be included and fluidly connected to flow pipe 300 (or connected to flow pipe 400). In various embodiments a second sampling piping 500' can be fluidly connected to the flow pipe 400 (e.g., the flow pipe that sampling pipe 500 is not fluidly connected to).

A portion of the produced water flowing through the produced water pipe 300 may be diverted through the sampling piping 500 having a bore 502, where a sensor 520 extending into the bore 502 measures physical and/or chemical characteristics of the produced water stream 115 in time intervals. FIG. 9 shows a view of the sensor 520. In one embodiment, the sampling piping 500 may include a plurality of sensors 520. The sensors 520 preferably measure the physical and/or chemical characteristics of the produced water stream 115 in timed intervals. In various embodiments the sensors 520 measure one or more physical and/or chemical characteristics of one of the fluid streams in pipes 300,400, which chemical or physical characteristic to be measured is selected from the group consisting of: pH, oxidation/reduction potential, turbidity/haze, total oxygen demand, viscosity, ionic strength/conductivity, specific chemical and/or metals concentrations, ionic strength/conductivity, specific chemical concentrations, density, crystallization temperature, biocide and/or microbial demand, free and total bromine/chlorine and/or bromine/chlorine residuals, and combinations thereof. The sensor 520, for example, can measure the physical and/or chemical characteristics of the produced water stream 115 in timed intervals of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds. The sensor 520, for example, can also measure the physical and/or chemical characteristics of the produced water stream 115 in timed intervals of 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, the time interval where the sensor 520 can measure the physical and/or chemical characteristics of the produced water stream 115 is preferably a range of between any two of the above specified time intervals. In one embodiment, the sensor 520 measure the physical and/or chemical characteristics of the produced water stream 115 continuously. In one embodiment, the sensor 520 is an inductive conductivity sensor. In one embodiment, the sensor 520 includes an ion specific electrode.

The sampling piping 500 preferably extends into the bore 301 of the produced water pipe 300 and includes inlet 505 for receiving the portion of the produced water flowing through the produced water pipe 300. The sampling pipe 500 also includes an outlet 510 that opens into the bore 502 and is sized and shaped to receive an adapter 560 including the sensor 520 such that the adapter 560 seals the outlet 510 and positions the sensor 520 within the bore 501 of the sampling piping 500. In one embodiment, the sampling piping 500 may include a plurality of outlets 510. As shown in FIG. 9, the outlet 510 preferably has an outer surface and external male threads 511 on the outer surface near the top of the outlet 510 and has an annular recess at the top of the outlet 510 for receiving an annular gasket 512. The adapter 560 preferably has an inner surface and internal female threads on the inner surface near the bottom of the adapter 560. When the adapter 560 is screwed onto the outlet 510, the external male threads 511 engage the female threads of the adapter 560 to create a seal 513.

The sensor 520 can be removed from the adapter 560 such that the sensor 520 can be replaced if it fails.

As the portion of the produced water stream enters through the inlet 505 and flows through the bore 502 of the sampling piping 500, the portion of the produced water stream preferably flows around, through the sensor 520 and exits the sampling piping 500 via an outlet 570, and back into the bore 301 of the produced water pipe 300.

The sampling piping 500 may also include a plurality of valves 540,550. The valves 540,550 are preferably positioned upstream and downstream of the outlet 510 and control the flow of the portion of produced water stream through the bore 502 of the sampling piping 500. The valves 540,550 can prevent the portion of the produced water stream from flowing through the bore 502 of the sampling piping 500. The prevention of the portion of the produced water stream from flowing through the sampling piping 500 could be used, for example, to allow for the replacement of the sensor 520 without having to stop the produced water stream 115.

FIG. 1 also shows an embodiment of the present invention in that the flow controller system/apparatus 200 includes sampling piping 500'. The sampling piping 500' has a bore 502'. In this embodiment, a portion of the fresh water flowing through the fresh water pipe 400 may be diverted through the bore 502' of the sampling piping 500', where a sensor 520' extending into the bore 502' measures physical and/or chemical characteristics of the fresh water stream 165 in time intervals. FIG. 9 shows a view of the sensor 520'. In one embodiment, the sampling piping 500' may include a plurality of sensors 520'. The sensors 520' preferably measure the physical and/or chemical characteristics of the fresh water stream 165 in timed intervals. The sensors 520' can preferably measure but are not be limited to: pH, oxidation/reduction potential, turbidity/haze, total oxygen demand, viscosity, ionic strength/conductivity, specific chemical and/or metals concentrations, ionic strength/conductivity, specific chemical concentrations, density, crystallization temperature, biocide and/or microbial demand, free and total bromine/chlorine and/or bromine/chlorine residuals, and combinations thereof. The sensor 520', for example, can measure the physical and/or chemical characteristics of the fresh water stream 165 in timed intervals of 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, or 59 seconds. The sensor 520', for example, can also measure the physical and/or chemical characteristics of the fresh water stream 165 in timed intervals of 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5 23, 23.5, 24, 24.5, 25, 25.5, 26, 26.5, 27, 27.5, 28, 28.5, 29, 29.5, or 30 minutes. In various embodiments, the time interval where the sensor 520' can measure the physical and/or chemical characteristics of the fresh water stream 165 is preferably a range of between any two of the above specified time intervals. In one embodiment, the sensor 520' measure the physical and/or chemical characteristics of the fresh water stream 165 continuously. In one embodiment, the sensor 520' is an inductive conductivity sensor. In one embodiment, the sensor 520' includes an ion specific electrode.

The sampling piping 500' preferably extends into the bore 401 of the fresh water pipe 400 and includes inlet 505 for receiving the portion of the fresh water flowing through the fresh water pipe 400. The sampling pipe 500' also includes an outlet 510' that opens into the bore 502' and is sized and shaped to receive an adapter 560' including the sensor 520' such that the adapter 560' seals the outlet 510' and positions the sensor 520' within the bore 501 of the sampling piping 500'. In one embodiment, the sampling piping 500' may include a plurality of outlets 510'. As shown in FIG. 9, the outlet 510' preferably has an outer surface and external male threads 511' on the outer surface near the top of the outlet 510' and has an annular recess at the top of the outlet 510' for receiving an annular gasket 512. The adapter 560' preferably has an inner surface and internal female threads on the inner surface near the bottom of the adapter 560'. When the adapter 560' is screwed onto the outlet 510', the external male threads 511' engage the female threads of the adapter 560' to create a seal 513'.

The sensor 520' can be removed from the adapter 560' such that the sensor 520' can be replaced if it fails.

As the portion of the fresh water enters through the inlet 505' and flows through the bore 502' of the sampling piping 500', the portion of the fresh water preferably flows around and/or through the sensor 520' and exits the sampling piping 500' via an outlet 570', and back into the bore 401 of the fresh water pipe 400.

The sampling piping 500' may also include a plurality of valves 540',550'. The valves 540',550' are preferably positioned upstream and downstream of the outlet 510' and control the flow of the portion of fresh water through the bore 502' of the sampling piping 500'. The valves 540',550' can prevent the portion of the portion of fresh water from flowing through the bore 502' of the sampling piping 500'. The prevention of the portion of the portion of the fresh water stream from flowing through the sampling piping 500' could be used, for example, to allow for the replacement of the sensor 520' without having to stop the fresh water stream 165.

Events Under which Method and Apparatus can Issue Alarms

In various embodiments the method and apparatus 10 can issue an alarm where the method and apparatus 10 determines that either the target value for the physical and/or chemical characteristic of the blended stream 1100 appears to not be able to be met by differential and/or fractional blending of pressurized streams 115 and 165 while substantially meeting the target value for the flow rates of blended stream 1100.

The first event would occur where the actual physical and/or chemical characteristic of both streams 115 and 165 exceed the target value for the physical and/or chemical characteristic of the blended stream 1100. The second event would occur where the actual physical and/or chemical characteristic of both streams 115 and 165 are less than the target value for the physical and/or chemical characteristic of the blended stream 1100. In both of these situations no amount of fractional blending of streams 115 and 165 will result in the out of range target value. In these situations the method and apparatus can issue a warning signal.

The third event would could occur where the pump volume capacity for either stream 115 and/or 165 is less than the target value for the flow rate of the blended stream 1100. This under capacity flow rate situation could cause a failure of the method and apparatus to obtain a "blended" target value for the predefined physical and/or chemical characteristic of the blended stream 1100. For example, if the target flow rate in the blended stream is 50 gallons per minute and each of the pumps pressurizing streams 115 and 165 are rated at 35 gallons per minute, there is a chance that the required fractional blending in one of the streams will exceed 35 gallons a minute rated flow rate capacity of the pump for the stream. In this case the controller 600 could issue a warning that the required fractional flow rate could not be obtained. In this case, the controller 600 could issue a warning when either valve 340 or 440 is 100 open preventing additional flow from the stream whose valve is already 100 percent open (and vice versa if either valve 340 or 440 is 100 closed). To avoid this situation it is preferred that the rated capacity of the pumps all exceed the target value for the flow rate of the blended stream 1100. Another way to address the issue would be to have variable flow rate pumps whose rated capacity each exceed the target value for the flow rate of the blended stream 1100, and have controller 600 control the pumps to increase as needed their pumping capacity. Another way to address this issue is to reduce the target value for the flow rate of the blended stream 1100, and issue a warning to the user.

In various embodiments the method and apparatus can go through a type of error checking for blending to obtaining the target value for the predefined physical and/or chemical characteristic of the blended stream 1100. In various embodiments it is assumed that the controller 600 is programmed to know which stream 115 or 165 has a higher physical and/or chemical characteristic compared to the target value of the predefined physical and/or chemical characteristic of the blended stream 1100. If the measured physical and/or chemical characteristic of the blended stream (e.g., by sensor 1050 or 1050') is lower than the target value then the method and apparatus 10 will increase the fractional amount of the stream (either 115 or 165) having the higher value (on the other hand if higher blended value sense then the controller 600 will increase the fractional amount of the stream (either 115 or 165) having the lower value). If method and apparatus performs this step of increasing or decreasing the fractional value and then retests the value of the blended stream 1100 and determines that the discrepancy from the measured value of the blended stream to the target value for the blended stream has increased rather than decreased, then the method and apparatus can switch to fractionally increasing the other pressurized stream to check to determine if this switch causes the discrepancy from the measured value of the blended stream to the target value for the blended stream to decrease, and if so continue to fractional increase the flow rate of this same stream until discrepancy from the measured value of the blended stream to the target value for the blended stream falls within a predefined acceptable discrepancy range in the target value for the blended stream 1100.

In one embodiment the method and apparatus can issue a warning where fractionally changing the flow rates of pressurized streams 115 and 165 does not alter the measured value of the blended stream 1100. This is expected to occur where the physical and/or chemical characteristics for both streams 115 and 165 are substantially the same. In various embodiments this warning can occur where the change in the measured value of the blended stream is less than a predefined minimum change. In various embodiments this predefined minimum change can be at least 0.1, 0.2, 0.3, 0.5, and 1 percent. In various embodiments this change can be within a range of between any two of the above specified percentage minimums.

In various embodiments the method and apparatus can use one or more blending units in series with each other.

Embodiments Illustrating Serial Blending

Figure 14:
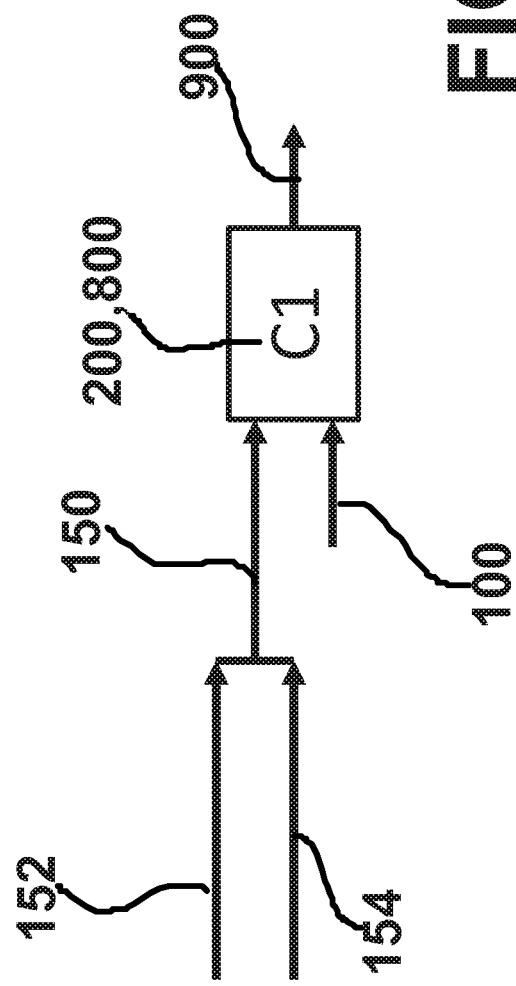
FIG. 14 is a schematic diagram illustrating a multi-line combination before being controllably blended with another pressurized stream using the method and apparatus.

FIG. 14 is a schematic diagram illustrating a multi-line combination (of first pressurized stream 152 and second pressurized stream 154 combined into pressurized input stream 150) before being controllably blended with another pressurized stream 100 using the method and apparatus 10. In this figure the method and apparatus 10 would include flow controller system/apparatus 200 as described in other embodiments with its exiting pressurized streams 110 and 160 being blended and/or mixed in blending unit 800 yielding blended output stream 900 for which a target physical or chemical characteristic is to be achieved.

Figure 15:
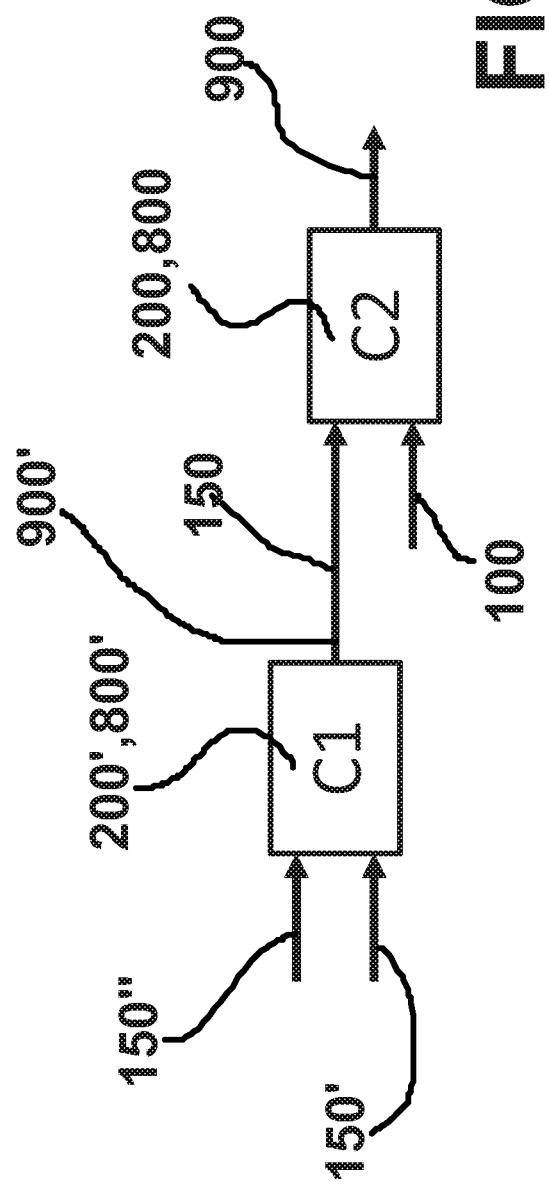
FIG. 15 is a schematic diagram illustrating an alternative embodiment where two flow controller systems/apparatuses can be placed in series with each other.

FIG. 15 is a schematic diagram illustrating an alternative embodiment where multiple flow controller systems/apparatuses 200,200' are placed in a serial configuration. FIG. 15 schematically shows method and apparatus 10 including a final flow controller system/apparatus 200 as described in previous embodiments with its particular exiting pressurized streams 110 and 160 being blended and/or mixed in blending unit 800 and ultimately yielding blended output stream 900 for which blended output stream a target physical or chemical characteristic is achieved along with achieving a target flow rate (both targets being within their respective bands of error for their respective predesignated target values as described in other embodiments). However, one or both of the pressurized input streams 100 and/or 150 (flowing into downstream system/apparatus 200) can themselves have multiple pressurized input streams (e.g., pressurized input streams 150' and 150" whose relative flow rates are themselves controlled by system/apparatus 200'. In FIG. 15 system/apparatus 200' is shown as having its blended output stream 900' being the pressurized input stream 150 to system/apparatus 200.

In FIG. 15 blended output stream 900' would itself have a predesignated target physical or chemical characteristics to be achieved within a predesignated maximum error range of this predesignated target physical or chemical characteristics for the blended stream 900', along with achieving a predesignated target flow rate for this blended output stream 900' within a predesignated maximum error range for said flow rate, and this blended output stream 900' becomes the pressurized input stream 150 for another downstream system/apparatus 200, which pressurized input stream 150 is then controllably blended with another pressurized input stream 100 for achieving predesignated target physical or chemical characteristics of pressurized output stream 900, along with achieving a target flow rate for pressurized output stream 900 (achieving both targets being within the target's respective allowable bands of deviations from their respective predesignated target values).

In various embodiments controller 600 can use "PRE" readings as well in a "Cascade" control scheme. With the cascade control scheme, controller 600 can adjust flow rate(s) according to a change in input level to avoid/preempt a discrepancy in the actual flow rate compared to a target flow rate.

LIST OF REFERENCE NUMERALS

The following is a list of reference numerals used in this specification:

| Reference Numeral | Description |
| --- | --- |
| 10 | system |
| 20 | natural water source (lake, river, stream, etc) |
| 30 | pump |
| 31 | pump control line |
| 40 | water well (fresh or brine) |
| 50 | pump |
| 51 | pump control line |
| 60 | earthen pit (on or off location) |
| 70 | pump |
| 71 | pump control line |
| 80 | frac tank(s) (single or battery) |
| 90 | pump |
| 91 | pump control line |
| 100 | produced water stream input |
| 110 | produced water stream output |
| 115 | produced water stream |
| 120 | above ground storage tank |
| 130 | pump |
| 131 | pump control line |
| 150 | fresh water stream input |
| 152 | first feed stream |
| 154 | second feed stream |
| 160 | fresh water stream output |
| 165 | fresh water stream |
| 200 | flow controller system/apparatus |
| 300 | produced water pipe |
| 301 | bore |
| 305 | pig catcher |
| 310 | inlet |
| 320 | outlet |
| 330 | flow meter |
| 340 | valve |
| 350 | flow meter line |
| 360 | valve control line |
| 400 | fresh water pipe |
| 401 | bore |
| 405 | pig catcher |

-continued

| Reference Numeral | Description |
| --- | --- |
| 410 | inlet |
| 420 | outlet |
| 430 | flow meter |
| 440 | valve |
| 450 | flow meter line |
| 460 | valve control line |
| 500, 500' | sampling piping |
| 501, 501' | adapter |
| 502, 502' | bore |
| 505, 505' | inlet |
| 510, 510' | outlet |
| 511, 511' | male threads |
| 512, 512 | gasket |
| 513, 513' | seal |
| 520, 520' | sensor |
| 530, 530' | sensor line |
| 540, 540' | valve |
| 550, 550' | valve |
| 560, 560' | bore |
| 570, 570' | outlet |
| 600 | controller |
| 610 | display interface |
| 620 | flow meter converter for produced water stream |
| 630 | flow meter converter for fresh water stream |
| 800 | blending manifold |
| 810 | inlet |
| 820 | inlet |
| 830 | inlet |
| 840 | inlet |
| 850 | mixing if the produced water stream output 110 and fresh water stream output 160 |
| 860 | plurality of outlets |
| 861 | outlet |
| 900 | plurality of outlet lines |
| 901 | outlet line |
| 910 | end |
| 930 | outlet |
| 950 | outlet line |
| 960 | section |
| 970 | section |
| 1000, 1000' | downstream sampling apparatus |
| 1010, 1010' | outlet |
| 1020, 1020' | outlet |
| 1030, 1030' | piping |
| 1031, 1031' | sampling piping |
| 1032, 1032' | bore |
| 1033, 1033 | bore |
| 1040, 1040' | inlet |
| 1050, 1050' | sensor(s) |
| 1060, 1060' | outlet |
| 1070, 1070' | valve |
| 1080, 1080' | sampling apparatus sensor line |
| 1090, 1090' | inlet |
| 1095, 1095' | adapter |
| 1096, 1096' | male threads |
| 1097, 1097' | annular gasket |
| 1098, 1098' | seal |
| 1100 | blended water stream |
| 1101 | blended/commingled aqueous fluid/water |
| 1200 | frac tank(s) |
| 1300 | line to near sources/destination |
| 1310 | near sources/destination |
| 1400, 1400' | flowchart |
| 1405, 1405' | step |
| 1410, 1410' | step |
| 1415, 1415' | step |
| 1420, 1420' | step |
| 1425, 1425' | step |
| 1430, 1430' | step |
| 1435, 1435' | step |
| 1440, 1440' | step |
| 1445, 1445' | step |
| 1450, 1450' | step |
| 1455, 1455' | step |

-continued

| Reference Numeral | Description |
| --- | --- |
| 1460, 1460' | step |
| 1465, 1465' | step |
| 1470, 1470' | step |
| 1475, 1475' | step |
| 1480, 1480' | step |
| 1485, 1485' | step |
| 1490, 1490' | step |
| 1495, 1495' | step |
| 1500, 1500' | step |
| 1505, 1505' | step |
| 1510, 1510' | step |
| 1515, 1515' | step |
| 1520, 1520' | step |
| 1525, 1525' | step |
| 1530, 1530' | step |
| 1535, 1535' | step |
| 1540, 1540' | step |
| 1545, 1545' | step |
| 1550, 1550' | step |
| 1555, 1555' | step |
| 1565, 1565' | step |
| 1570, 1570' | step |
| 1575, 1575' | step |
| 1580, 1580' | step |
| 1585, 1585' | step |
| 1590, 1590' | step |
| 1600 | flowchart |
| 1605 | step |
| 610 | step |
| 1615 | step |
| 1620 | step |
| 1625 | step |
| 1630 | step |
| 1635 | step |
| 1640 | step |
| 1645 | step |
| 1650 | step |
| 1655 | step |
| 1660 | step |
| 1665 | step |
| 1670 | step |
| 1675 | step |
| 1680 | step |
| 1685 | step |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method for controlled delivery of a fluid for well bore operations comprising:
   a) providing a plurality of pressurized sources of an aqueous base fluid having respective flow rates, and providing at least one target predetermined physical and/or chemical characteristic value;
   b) blending at least two of the pressurized sources of aqueous base fluid creating a blended pressurized source of aqueous base fluid at an overall target blended flow rate;
   c) testing the blended pressurized source of aqueous base fluid to determine the blended source's at least one physical and/or chemical characteristic value;
   d) comparing the tested at least one physical and/or chemical characteristic data of the blended pressurized source of aqueous base fluid of step "b" to the target at least one target predetermined physical and/or chemical characteristic value to identify if they match;
   e) based on the comparison made in step "d" altering the flow rates of at least two of the plurality of pressurized sources of aqueous base fluid of step "a" while maintaining substantially the same target overall blended flow rate; and
   f) repeating steps "c" through "e" until the blended pressurized source of aqueous base fluid matches the at least one target predetermined physical and/or chemical characteristic value.

2. The method of claim 1, wherein the testing of step "c" occurs at predetermined time intervals, and wherein the predetermined time intervals range from 0.01 seconds to 30 minutes.

3. The method of claim 1, wherein the testing of step "c" occurs at predetermined time intervals, and wherein the predetermined time intervals range from 1 minute to 5 minutes.

4. The method of claim 2, wherein steps "d" and "e" occur within the predetermined time intervals.

5. The method of claim 1, wherein the at least one target predetermined physical and/or chemical characteristics is an indicator of chlorine content blended pressurized source of aqueous base fluid, after step "f", further comprising the step of providing the blended pressurized source of aqueous base fluid to a wellbore for use in fracking operations.

6. The method of claim 1, wherein the at least one target predetermined physical and/or chemical characteristics fall within a range of less than five percent deviation from a set of base targets of predetermined physical and/or chemical characteristics.

7. The method of claim 1, wherein step "e" is performed without comparing the at least one physical and/or chemical characteristic data for the at least two pressurized sources of aqueous base fluid.

8. The method of claim 1, wherein:
   (i) one of the at least two pressurized sources of aqueous base fluid has a first flow rate and another of the at least two pressurized sources of aqueous base has a second flow rate;
   (ii) during step "d" a first differential value is calculated for the at least one tested physical and/or chemical characteristic data of the blended pressurized source of aqueous base fluid of step "b" and the at least one predetermined target physical and/or chemical characteristic data of the blended pressurized source of aqueous base fluid,
   (iii) after the first differential value is calculated, the first flow rate is reduced and the second flow rate increased, and step "d" is repeated and a second differential value is calculated for the at least one tested physical and/or chemical characteristic data of the blended pressurized source of aqueous base fluid of step "b" and the at least one predetermined target physical and/or chemical characteristic data of the blended pressurized source of aqueous base fluid, and if, the second differential value is smaller than the first differential value then the first flow rate is reduced again and the second flow rate increased again, but if the second differential value is larger than the first differential value then the first flow rate is increased and the second flow rate decreased.

9. The method of claim 1, wherein
   (i) one of the at least two pressurized sources of aqueous base fluid has a first flow rate and another of the at least two pressurized sources of aqueous base has a second flow rate;
   (ii) during step "d" a first differential value is calculated for the at least one tested physical and/or chemical characteristic data of the blended pressurized source of aqueous base fluid of step "b" and the at least one predetermined target physical and/or chemical characteristic data of the blended pressurized source of aqueous base fluid, (iii) after the first differential value is calculated, the first flow rate is reduced and the second flow rate increased, and step "d" is repeated and a second differential value is calculated for the at least one tested physical and/or chemical characteristic data of the blended pressurized source of aqueous base fluid of step "b" and the at least one predetermined target physical and/or chemical characteristic data of the blended pressurized source of aqueous base fluid, and where the second differential value has less than a one percent change from the first differential value a warning is generated.

10. A method of creating a source of blended aqueous base fluid comprising the steps of:
a) providing a plurality of pressurized sources of an aqueous base fluid having first and second flow rates for creating a blended pressurized flow having a blended target flow rate and at least one target predetermined physical and/or chemical characteristic data;
b) blending the pressurized sources fluid creating a blended pressurized stream of aqueous base fluid of the target flow rate;
c) testing the blended pressurized stream aqueous base fluid to determine the blended stream's physical and chemical characteristics;
d) comparing the at least one tested physical and/or chemical characteristic data of the blended stream of step "b" to the at least one target physical and/or chemical characteristic data;
e) based on the comparison made in step "d" a controller altering the first and second flow rates while maintaining substantially the same target blended flow rate; and
f) repeating steps "c" through "e" until the blended pressurized stream of aqueous base fluid achieves the predetermined physical and chemical characteristics.

11. The method of claim 10, wherein the testing of step "c" occurs at predetermined time intervals, and wherein the predetermined time intervals range from 0.01 seconds to 30 minutes.

12. The method of claim 10, wherein the testing of step "c" occurs at predetermined time intervals, and wherein the predetermined time intervals ranges from 1 minute to 5 minutes.

13. The method of claim 11, wherein steps "d" and "e" occur within the predetermined time intervals.

14. The method of claim 10, wherein the at least one target predetermined physical and/or chemical characteristic is an indicator of chlorine content in the blended pressurized stream source of aqueous base fluid, after step "f", further comprising the step of providing the blended pressurized source of aqueous base fluid to a wellbore for use in fracking operations.

15. The method of claim 10, wherein the at least one target predetermined physical and/or chemical characteristic data falls within a range of less than five percent deviation from a base at least one target of predetermined physical and/or chemical characteristic data.

16. The method of claim 10, wherein step "e" is performed without comparing physical and/or chemical characteristic data for the plurality of pressurized sources of aqueous base fluid.

17. The method of claim 10, wherein a first pump is fluidly connected to one of the plurality of pressurized sources of aqueous base fluid having the first flow rate and a second pump is fluidly connected to another of the at least two pressurized sources of aqueous base having the second flow rate, and during step "e" the first pump is operated to change the first flow rate and the second pump is operated to change the second flow rate.

18. The method of claim 17, wherein the first pump has a first pump maximum flow rate and the second pump has a maximum second pump flow rate, and a warning signal is given where either the first pump maximum flow rate and/or second pump maximum flow rate is reached during step "e".

19. The method of claim 10, wherein
(i) one of the plurality of pressurized sources of aqueous base fluid has the first flow rate and another of the plurality of pressurized sources of aqueous base has the second flow rate;
(ii) during step "d" a first differential value is calculated for the tested physical and/or chemical characteristic data of the blended pressurized source of aqueous base fluid of step "b" and the at least one predetermined target physical and/or chemical characteristic data of the blended pressurized source of aqueous base fluid,
(iii) after the first differential value is calculated, the first flow rate is reduced and the second flow rate increased, and step "d" is repeated and a second differential value is calculated for the at least one tested physical and/or chemical characteristic data of the blended pressurized source of aqueous base fluid of step "b" and the at least one predetermined target physical and/or chemical characteristic data of the blended pressurized source of aqueous base fluid, and if, the second differential value is smaller than the first differential value then the first flow rate is reduced again and the second flow rate increased again, but if the second differential value is larger than the first differential value then the first flow rate is increased and the second flow rate decreased.

20. The method of claim 10, wherein
(i) one of the plurality of pressurized sources of aqueous base fluid has the first flow rate and another of the plurality of pressurized sources of aqueous base has a second flow rate;
(ii) during step "d" a first differential value is calculated for the at least one tested physical and/or chemical characteristic data of the blended pressurized source of aqueous base fluid of step "b" and the at least one predetermined target physical and/or chemical characteristic data of the blended pressurized source of aqueous base fluid,
(iii) after the first differential value is calculated, the first flow rate is reduced and the second flow rate increased, and step "d" is repeated and a second differential value is calculated for the at least one tested physical and/or chemical characteristic data of the blended pressurized source of aqueous base fluid of step "b" and the at least one predetermined target physical and/or chemical characteristic data of the blended pressurized source of aqueous base fluid, and where the second differential value has less than a one percent change from the first differential value a warning is generated.

* * * * *